(12) United States Patent
Chen et al.

(10) Patent No.: US 11,734,826 B2
(45) Date of Patent: Aug. 22, 2023

(54) IMAGE SEGMENTATION METHOD AND APPARATUS, COMPUTER DEVICE, AND STORAGE MEDIUM

(71) Applicant: TENCENT TECHNOLOGY (SHENZHEN) COMPANY LIMITED, Guangdong (CN)

(72) Inventors: Si Hong Chen, Shenzhen (CN); Ye Feng Zheng, Shenzhen (CN)

(73) Assignee: TENCENT TECHNOLOGV (CHENZHEN) COMPANY LIMITED, Shenzhen (CN)

( * ) Notice: Subject to any disclaimer, the term of this patent is extended or adjusted under 35 U.S.C. 154(b) by 422 days.

(21) Appl. No.: 17/173,259

(22) Filed: Feb. 11, 2021

(65) Prior Publication Data
US 2021/0166396 A1    Jun. 3, 2021

Related U.S. Application Data

(63) Continuation of application No. PCT/CN2019/119770, filed on Nov. 20, 2019.

(30) Foreign Application Priority Data

Nov. 27, 2018    (CN) .......................... 201811425694.8

(51) Int. Cl.
*G06T 7/11*        (2017.01)
*G06T 7/73*        (2017.01)
(Continued)

(52) U.S. Cl.
CPC .............. *G06T 7/11* (2017.01); *G06F 18/213* (2023.01); *G06F 18/2148* (2023.01);
(Continued)

(58) Field of Classification Search
CPC ... G06T 7/11; G06T 7/246; G06T 7/74; G06T 7/73; G06T 7/174; G06T 7/194;
(Continued)

(56) References Cited

U.S. PATENT DOCUMENTS 10,360,731 B2 *   7/2019   Zhang .................... G06T 11/00
2011/0286631 A1   11/2011  Wagner et al.
2013/0301911 A1   11/2013  Rong et al.

FOREIGN PATENT DOCUMENTS

CN        104573742 A    4/2015
CN        104881861 A    9/2015
(Continued)

OTHER PUBLICATIONS

Office Action of CN 201811425694.8 dated Jul. 11, 2019.
(Continued)

*Primary Examiner* — Kenny A Cese
(74) *Attorney, Agent, or Firm* — Sughrue Mion, PLLC

(57)    ABSTRACT

An image segmentation method, apparatus, and a storage medium are provided. The method includes: selecting a current image frame in a video according to a time sequence of the video; determining a reference image frame before the current image frame in the time sequence; obtaining first location information of a target object key point in the reference image frame; performing an affine transformation on the current image frame with reference to an affine transformation relationship between the first location information and a target object key point template to obtain a target object diagram; performing a key point detection on the target object diagram to obtain second location information of the target object key point; segmenting a target object from the target object diagram to obtain segmentation information; and obtaining the target object from the current
(Continued)

image frame according to the segmentation information and the second location information.

20 Claims, 8 Drawing Sheets

(51) Int. Cl.
*G06T 7/246* (2017.01)
*G06T 3/00* (2006.01)
*G06V 20/40* (2022.01)
*G06F 18/213* (2023.01)
*G06F 18/214* (2023.01)

(52) U.S. Cl.
CPC ............ *G06T 3/0006* (2013.01); *G06T 7/246* (2017.01); *G06T 7/74* (2017.01); *G06V 20/40* (2022.01); *G06V 20/41* (2022.01); *G06V 20/46* (2022.01); *G06T 2207/10016* (2013.01); *G06T 2207/10132* (2013.01); *G06T 2207/20081* (2013.01); *G06T 2207/20084* (2013.01); *G06T 2207/20216* (2013.01); *G06T 2207/30048* (2013.01); *G06V 2201/031* (2022.01)

(58) Field of Classification Search
CPC ... G06T 3/0006; G06T 3/4038; G06T 3/0068; G06T 3/00; G06T 2207/10016; G06T 2207/10132; G06T 2207/20081; G06T 2207/20084; G06T 2207/20216; G06T 2207/30048; G06F 18/213; G06F 18/2148; G06F 16/70; G06V 20/40; G06V 20/41; G06V 20/46; G06V 20/62; G06V 2201/031; G06V 10/267; H04N 21/234; H04N 21/44
See application file for complete search history.

(56) References Cited

FOREIGN PATENT DOCUMENTS

| | | |
|---|---|---|
| CN | 107103605 A | 8/2017 |
| CN | 108171244 A | 6/2018 |
| CN | 108427951 A | 8/2018 |
| CN | 108510493 A | 9/2018 |
| CN | 108520223 A | 9/2018 |
| CN | 109492608 A | 3/2019 |

OTHER PUBLICATIONS

International Search Report of PCT/CN2019/119770 dated Feb. 21, 2020 [PCT/ISA/210].
Written Opinion of PCT/CN2019/119770 dated Feb. 21, 2020 [PCT/ISA/237].
Erez Farhan et al., "Point Matching Via Affine Region Expansion", 2014 IEEE International Conference on Image Processing (ICIP), IEEE, Oct. 27, 2014, pp. 383-387, XP032966621 (5 pages total).
Jilliam Maria Diaz Barros et al., "Fusion of Keypoint Tracking and Facial Landmark Detection for Real-Time Head Pose Estimation", 2018 IEEE Winter Conference on Application S of Computer Vision (WACV), IEEE, Mar. 12, 2018, pp. 2028-2037, XP033337873 (11 pages total).
Extended European Search Report dated Oct. 27, 2021 from the European Patent Office in EP Application No. 19890613.3.
Communication dated Nov. 16, 2021 from the European Patent Office in EP Application No. 19890613.3.

* cited by examiner

IMAGE SEGMENTATION METHOD AND APPARATUS, COMPUTER DEVICE, AND STORAGE MEDIUM

CROSS-REFERENCE TO RELATED APPLICATION(S)

This application is a continuation of PCT/CN2019/119770 filed Nov. 20, 2019, and claims priority to Chinese Patent Application No. 201811425694.8, entitled "IMAGE SEGMENTATION METHOD AND APPARATUS, COMPUTER DEVICE, AND STORAGE MEDIUM" and filed with the National Intellectual Property Administration, PRC, Nov. 27, 2018, the disclosures of which are incorporated by reference herein in their entirety.

FIELD

The disclosure relates to the field of computer technologies, and in particular, to an image segmentation method and apparatus, a computer device, and a storage medium.

BACKGROUND

With the fast development of sciences and technologies, various video technologies are being applied in various environment. Each frame of image in a video may include a plurality of objects, and in some scenarios, a target object in the image may need to be obtained from the video image through segmentation. For example, in the medical field, an image of a body part may need to be obtained from an ultrasound video image of a human body region through segmentation.

In a related method, when segmentation is performed on a target object in a video image, an original image in a video and an optical flow image are inputted together to a convolutional neural network and encoded. Subsequently, feature maps obtained after the original image and the optical flow image that are separately encoded are connected in series, and then uniformly decoded to obtain the target object from the original image through segmentation. As a result, a large quantity of data processing needs to be performed, and a large quantity of computing resources need to be consumed.

SUMMARY

Provided are an image segmentation method and apparatus, a computer device, and a storage medium to resolve a problem that a large quantity of computing resources need to be consumed in the related method.

According to an embodiment, there is provided an image segmentation method, performed by a computer device. The method includes: sequentially selecting a current image frame among one or more image frames in a video according to a time sequence of the video; determining a reference image frame from among the one or more image frames before the current image frame in the time sequence of the video; obtaining first location information of a target object key point in the reference image frame; performing an affine transformation on the current image frame with reference to an affine transformation relationship between the first location information and a target object key point template to obtain a target object diagram of the current image frame; performing a key point detection on the target object diagram to obtain second location information of the target object key point; segmenting a target object from the target object diagram to obtain segmentation information of the target object; and obtaining the target object from the current image frame according to the segmentation information and the second location information.

According to an embodiment, there is provided an image segmentation apparatus, including: at least one memory storing computer program code; at least one processor configured to access the at least one memory and operate as instructed by the computer program code. The computer program code includes: selection code configured to cause the at least one processor to sequentially select a current image frame among one or more image frames in a video according to a time sequence of the video; affine transformation code configured to cause the at least one processor to determine a reference image frame from among the one or more image frames before the current image frame in the time sequence of the video; obtain first location information of a target object key point in the reference image frame; and perform an affine transformation on the current image frame with reference to an affine transformation relationship between the first location information and a target object key point template to obtain a target object diagram of the current image frame; target object information obtaining code configured to cause the at least one processor to perform a key point detection on the target object diagram to obtain second location information of the target object key point; and segment a target object from the target object diagram, to obtain segmentation information of the target object; and segmentation code configured to cause the at least one processor to obtain the target object from the current image frame according to the segmentation information and the second location information.

According to an embodiment, there is provided a non-transitory computer-readable storage medium, storing at least one computer program code, the at least one computer program code, when executed by a processor, causes the processor to: sequentially select a current image frame among one or more image frames in a video according to a time sequence of the video; determine a reference image frame from among the one or more image frames before the current image frame in the time sequence of the video; obtain first location information of a target object key point in the reference image frame; perform an affine transformation on the current image frame with reference to an affine transformation relationship between the first location information and a target object key point template to obtain a target object diagram of the current image frame; perform a key point detection on the target object diagram to obtain second location information of the target object key point; segment a target object from the target object diagram to obtain segmentation information of the target object; and obtain the target object from the current image frame according to the segmentation information and the second location information.

DESCRIPTION

To make the objectives, technical solutions, and advantages of the disclosure understandable, the one or more embodiments of the disclosure are described in detail below with reference to accompanying drawings. It is to be understood that the specific embodiments described herein are only used for describing the disclosure, and should not be construed as limiting the scope of the disclosure.

Figure 1:
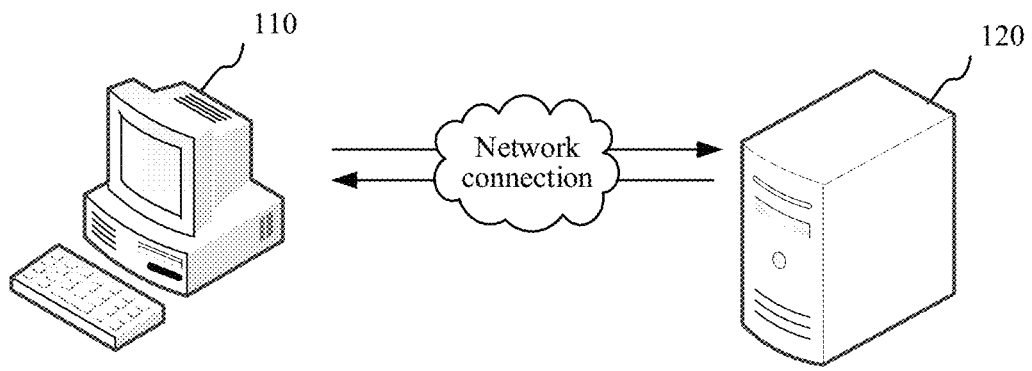
FIG. 1 is a diagram of an application scenario of an image segmentation method according to an embodiment.

FIG. 1 is a diagram of an application scenario of an image segmentation method according to an embodiment. Referring to FIG. 1, the application scenario includes a terminal 110 and a server 120 that are connected through a network. The terminal 110 may be a smart TV, a desktop computer or a mobile terminal. The mobile terminal may include a mobile phone, a tablet computer, a notebook computer, a personal digital assistant, and a wearable device. The server 120 may be implemented by an independent server or a server cluster that includes a plurality of physical servers.

The terminal 110 may transmit a video or an image to the server 120, to cause the server 120 to obtain a target object in each frame image of the video through segmentation.

For example, the server 120 may sequentially select a current image frame according to a time sequence in a video, determine a reference image frame from among image frames before the current image frame in the time sequence in the video, obtain first location information of a target object key point in the reference image frame, and perform affine transformation on the current image frame with reference to an affine transformation relationship between the first location information and a target object key point template, to obtain a target object diagram of the current image frame. Further, the server 120 may perform key point detection on the target object diagram to obtain second location information of the target object key point, segment a target object from the target object diagram to obtain segmentation information of the target object, and obtain the target object through segmentation from the current image frame according to the segmentation information and the second location information. Additionally, the server 120 may transmit or feedback a segmentation result to the terminal 110 for display.

It may be understood that the terminal 110 may not send the video to the server for detection and analysis, and the terminal 110 itself may alternatively have a function of performing the image segmentation method according to the embodiments of the disclosure. For example, the terminal may include a computer processing function, and perform steps of the image segmentation method according to the embodiments on a video.

In an embodiment, the terminal 110 may further include a medical treatment detection terminal. The medical treatment detection terminal may be an instrument terminal used for medical treatment detection. The medical treatment detection terminal may include a detection probe and a display device. The detection probe may be, for example, a lens of a video camera. As the detection probe rotates, structures of a detected object can be clearly displayed on the display device. The medical treatment detection terminal may be, for example, a cardiac ultrasound detection instrument. The cardiac ultrasound detection instrument (also known as echocardiogram or ECHO) is an instrument for detecting and imaging a heart by using an ultrasound wave method. It may be understood that, the medical treatment detection terminal may alternatively be an instrument for performing ultrasound detection on another part of a human body.

For ease of understanding, the terminal 110 is described as a cardiac ultrasound detection instrument as an example, a use scenario thereof is provided. For example, a doctor may place the detection probe in the terminal 110 and put the terminal 110 near a heart part of a patient to perform detection, and the detection probe may capture frames of cardiac ultrasound section diagrams by using the ultrasound wave, to form a cardiac ultrasound detection video to be displayed on the display device. The terminal 110 may alternatively transmit a cardiac ultrasound detection video to the server 120, to cause the server 120 to obtain a left ventricle in each frame of image of the video through segmentation.

The foregoing example is only used for schematic description, and the terminal 110 is not limited to the medical treatment detection terminal. The video is not limited to the cardiac ultrasound detection video, and may alternatively be any other type of video. Moreover, the terminal 110 may be configured to not only detect the left ventricle image, but also any single target object in a video. For example, the single target object may be a heart or a left ventricle of a heart.

Figure 2:
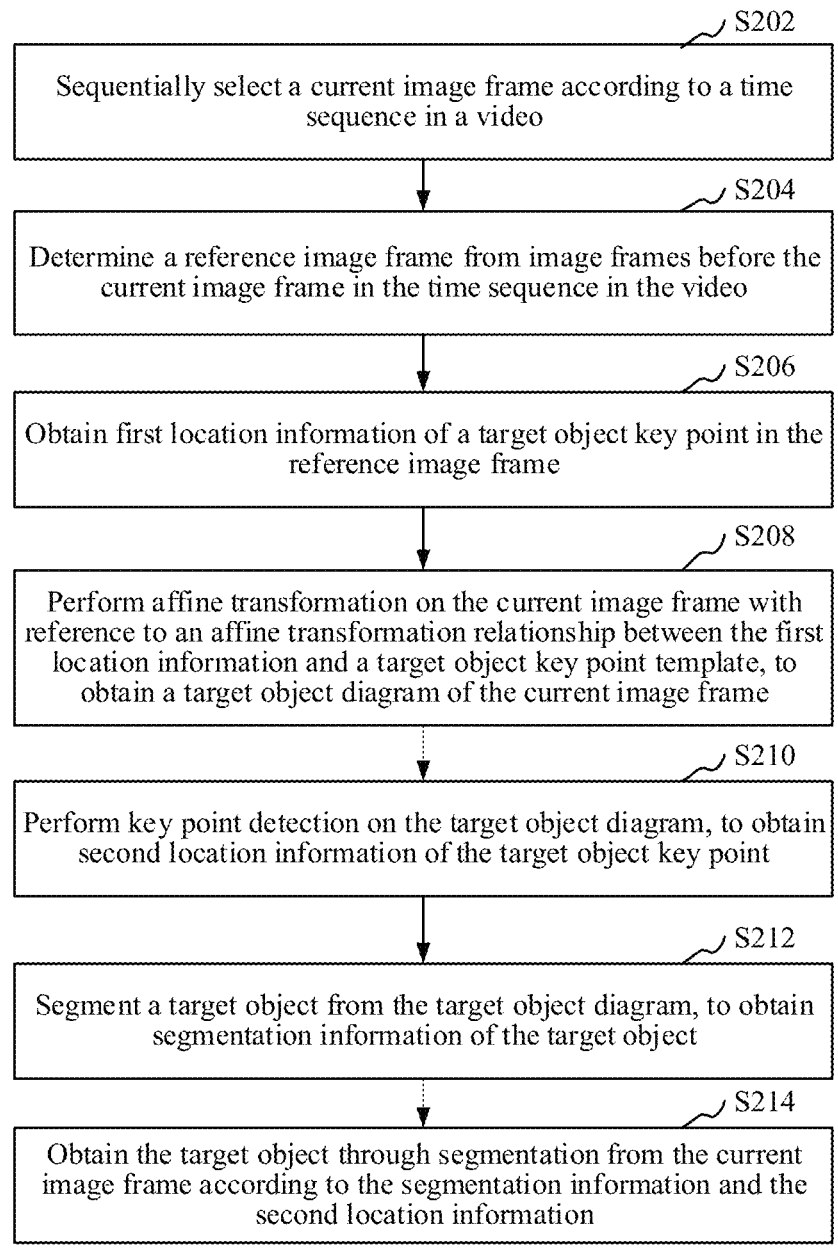
FIG. 2 is a schematic flowchart of an image segmentation method according to an embodiment.

FIG. 2 is a schematic flowchart of an image segmentation method according to an embodiment. In this embodiment, an example in which the image segmentation method is applied to a computer device is mainly used for description. The computer device may be the server 120 or the terminal 110 in FIG. 1. Referring to FIG. 2, the method specifically includes the following steps:

S202. Sequentially select a current image frame according to a time sequence in a video.

The video may be any type of video. The video may include image frames arranged in the time sequence.

In an embodiment, the video may include an ordinary video of daily life, for example, a video recorded in a mobile phone, or a video in various video programs of a video website.

In an embodiment, the video may include a particular type of video captured by using a particular detection technology, for example, an ultrasound video. The ultrasound video is a video captured when ultrasound detection is performed by using the ultrasound wave technology.

In an embodiment, the ultrasound video may be a video obtained by performing ultrasound detection on a human organ. The ultrasound video may include an abdomen ultrasound detection video, and the abdomen ultrasound detection video is a video captured when ultrasound detection is performed on an abdomen, for example, a video obtained by performing ultrasound detection on a part such as a liver, a gall bladder, or a stomach. The ultrasound video may be not limited to images of a human organ, but may also include, for example, images of a non-human organ.

In an embodiment, the ultrasound video may include a cardiac ultrasound detection video. The cardiac ultrasound detection video is a video captured when ultrasound detection is performed on a heart.

In an embodiment, an image frame in a video may be a normal image frame. The normal image frame may be an image frame of a target object presented in a normal state thereof. Also, an image frame in a video may be an abnormal image frame. The abnormal image frame may be an image frame of a target object presented in an abnormal state thereof. For example, an image frame in a video may be a section diagram. The section diagram is an effect diagram of simulating that an object is "sectioned", and in the section diagram, the target object is presented in a "sectioned" state.

In an embodiment, an image frame may alternatively be an ultrasound section diagram. The ultrasound section diagram is a two-dimensional ultrasound diagram. After penetrating a chest wall, an ultrasound beam generated by the detection probe performs sector-shaped scanning, and echo signals reflected from a human body form a section image in the form of light spots. It may be understood that, expressed from a relatively vivid perspective, the reflected echo signals cause this scanning surface formed by the sector-shaped scanning to have an effect of "sectioning" an organ, and therefore the echo signals reflected from the human body form the section image in the form of light spots.

It may be understood that the method of obtaining the section diagram is not limited to an ultrasound manner. For example, a section diagram can also be obtained by directly capturing, by using an ordinary capture method, an image of a target object presented as a section in a physical world.

In an embodiment, the ultrasound section diagram may include a cardiac ultrasound section diagram, and the cardiac ultrasound detection video includes frames of cardiac ultrasound section diagrams arranged in a time sequence. That is, when the video is a cardiac ultrasound detection video, the current image frame may be a cardiac ultrasound section diagram.

It may be understood that, the ultrasound section diagram may further include a liver ultrasound section diagram, a lung ultrasound section diagram, or the like.

Figure 3:
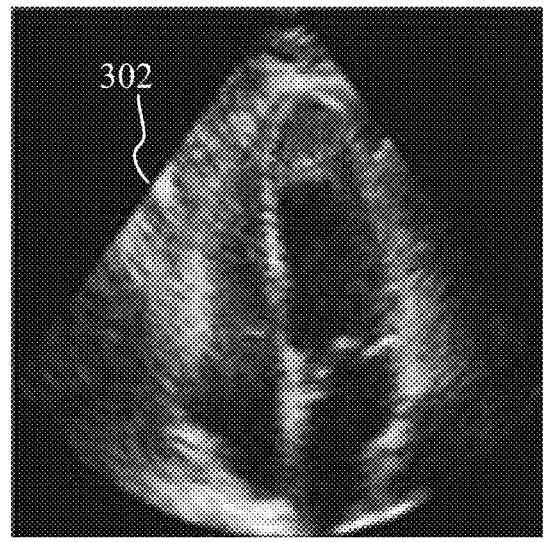
FIG. 3 is a schematic diagram of a section image according to an embodiment.

For ease of understanding the section diagram, descriptions may be provided by using an example with reference to FIG. 3. FIG. 3 is a schematic diagram for describing a section diagram by using a cardiac ultrasound section diagram as an example. An ultrasound beam performs sector-shaped scanning to obtain a scanning surface 302 having an effect of approximately "sectioning" a heart, and the cardiac ultrasound section diagram in FIG. 3 can be obtained. It may be understood that, the scanning surface does not physically section the heart, but instead, according to distances relative to reflected echo signals, a section image may be obtained by approximately sectioning the scanning surface.

In an embodiment, a computer device may sequentially select a current image frame according to a time sequence in a video. That is, the computer device may sequentially select a current image frame in an order from beginning to end of the time sequence, and perform the following steps S204 to S214 on the selected current image frame. According to one or more embodiments, after a target object is obtained from a current image frame through segmenting, a next image frame may be selected from the video as a current image frame according to the time sequence, to continue to perform processing steps of the image segmentation method in the embodiments on the new current image frame.

S204. Determine a reference image frame from among image frames before the current image frame in the time sequence of the video.

It may be understood that, all image frames in the video are sorted according to the time sequence. It may be understood that, image frames in the time sequence before the current image frame are all or some image frames in the video before the current image frame in the time sequence. For example, if the current image frame is the 5th image frame, image frames in the video before the 5th image frame in the time sequence may be all or some of the first to fourth image frames in the time sequence.

The reference image frame is an image frame before the current image frame in the time sequence used to provide reference information when the target object in the current image frame is segmented. It may be understood that, target object segmentation may be performed on the current image frame by using time sequence priori reference information provided by the reference image frame.

It may be understood that, a quantity of reference image frames may include at least one reference image.

In an embodiment, when there is one reference image frame, the reference image frame may be any one of the image frames before the current image frame in the time sequence, and may alternatively be a preceding image frame of the current image frame. When there are a plurality of reference image frames, the reference image frames may be any more than one of the image frames before the current image frame in the time sequence, and may alternatively be a plurality of image frames sequentially selected in ascending order of distances from the current image frame.

S206. Obtain first location information of a target object key point in the reference image frame.

The target object is an object to be obtained from the current image frame through segmentation.

The target object may be any object intended to be obtained through segmentation. For example, in a bicycle match video, a target object may be a bicycle in a video picture, and/or may be a participating athlete in a video picture.

In an embodiment, the target object may be the left ventricle. It may be understood that, the target object may be a liver, a lung or the like, and is not enumerated herein. The target object key point is a point used for representing a feature of the target object.

In an embodiment, when the target object is the left ventricle, the target object key point is a left ventricle key point. The left ventricle key point refers to a point in a picture used for representing a feature of the left ventricle.

In an embodiment, left ventricle key points include a left ventricle top cusp and two endpoints of a mitral valve. The left ventricle top cusp, namely, cardiac apex, is a lower left conic tip of the heart. The mitral valve, namely, the left atrioventricular valve, is appended to the left fibrous atrioventricular ring, and formed by folds of the endocardium. The mitral valve has two valves, and the two endpoints of the mitral valve are endpoints of the two valves. The left ventricle key points are not limited to the foregoing three points, and points at other locations in the left ventricle may be set as key points.

In an embodiment, when the target object is a human face, the target object key points may include points representing facial features. It may be understood that, normally, facial features of a human basically do not change, and therefore can represent features of a human face, so that the points representing the facial features may be used as key points.

It may be understood that, the first location information of the target object key point in the reference image frame is known. According to the image segmentation method in the embodiments, a current image frame is selected in a time sequence, and after segmentation on a target object in a current image frame is completed, a next image frame is selected as a new current image frame, to perform iteration according to the image segmentation described above. Therefore, when the target object in the current image frame is segmented, an image frame in the time sequence before the current image frame has been segmented to obtain first location information of the target object key point in the image frame and segmentation information of the target object. Therefore, the reference image frame determined in the image frames before the current image frame includes the first location information of the target object key point in the reference image frame and the segmentation information of the target object. Therefore, the computer device may obtain the known first location information of the target object key point in the reference image frame.

S208. Perform affine transformation on the current image frame with reference to an affine transformation relationship between the first location information and a target object key point template, to obtain a target object diagram of the current image frame.

A key point template is used to represent location information of a preset key point. The target object key point template is used to represent preset location information of the preset target object key point by using an image in which a main region is the target object region as a reference. That is to say, preset location information of each target object key point in the target object key point template is location information of the target object key point represented on an image whose main region is the target object region. It may be understood that, the main region being the target object region means that the region area of the target object accounts for a main part in the image.

The affine transformation relationship may be used to perform an affine transformation operation when the first location information of the target object key point in the reference image frame is transformed into the preset location information of the target object key point in the target object key point template.

For example, an affine transformation operation, such as rotation, translation, or tailoring, may be performed on the current image frame to obtain the target object diagram of the current image frame.

In an embodiment, the affine transformation relationship may be represented through an affine transformation matrix.

It may be understood that, the affine transformation relationship between the first location information and the target object key point template is used to represent affine transformation required when the first location information of the target object key point in the reference image frame is transformed to be consistent with the preset location information of the target object key point in the target object key point template. However, because both the target object key points in the current image frame and the target object key points in the reference image frame before the current image frame represent the key points of the same target object, relative locations between the target object key points in the two image frames are consistent. Therefore, the performing affine transformation on the current image frame according to the affine transformation relationship is equivalent to adjusting location information of the target object key point in the current image frame to preset location information of the target object key point in the target object key point template. The target object key point template is used to represent preset location information of the preset target object key point by using an image in which a main region is the target object region, as a reference. Therefore, after affine transformation is performed on the current image frame according to the foregoing affine transformation relationship, a region of interest (ROI), that is, the target object diagram of the target object in the current image frame can be obtained. The region of interest is a region selected from an image and representing a focus to which an image analysis is to be performed. It may be understood that, the target object region in the target object diagram is the focal region.

In an embodiment, the computer device may extract the preset location information of the target object key point from the target object key point template, and calculate a transformation matrix according to the first location information and the preset location information of the target object key point in the target object key point template. The computer device may perform affine transformation on the current image frame according to the transformation matrix to obtain the target object diagram of the current image frame. In an embodiment, the computer device may multiply the current image frame by the transformation matrix to obtain the target object diagram of the current image frame.

It may be understood that, when the target object is the left ventricle, the target object diagram is the left ventricle diagram. The left ventricle diagram, that is, a region of interest of the left ventricle, is an image in which a region of the left ventricle is a main region.

S210. Perform key point detection on the target object diagram to obtain second location information of the target object key point.

It may be understood that, the computer device may directly perform image analysis on the target object diagram itself, and identify the target object key point from the target object diagram to obtain the second location information of the target object key point.

In an embodiment, the computer device may input the target object diagram to a multi-task network, perform key point detection on the target object diagram through a key point detection model in the multi-task network, and output the second location information of the target object key point corresponding to the target object diagram. The multi-task network is a network that can perform a plurality of processing tasks in parallel. The multi-task network includes the key point detection model.

In an embodiment, the computer device may detect, through the key point detection model, a location information difference between the target object key point in the target object diagram and the target object key point in the target object key point template; and add preset location information of the target object key point in the target object key point template and the location information difference to obtain the second location information of the target object key point in the target object diagram.

S212. Segment a target object from the target object diagram to obtain segmentation information of the target object.

The segmentation information of the target object may be used to obtain the target object region from the target object diagram through segmentation, that is, used to distinguish the target object region from another region in the target object diagram. In an embodiment, the segmentation information of the target object includes pixel points of the target object.

In an embodiment, the computer device may perform the target object segmentation on the target object diagram to obtain a segmentation outline of the target object.

In an embodiment, the multi-task network may further include one or more segmentation models. The computer device may input the target object diagram to a pre-trained segmentation model in the multi-task network, perform semantic segmentation on the target object diagram through the pre-trained segmentation model, and output the segmentation information of the corresponding target object.

In an embodiment, the computer device may predict, through the segmentation model, categories of all pixel points in the target object diagram, and form, according to pixel points belonging to the foreground category, the segmentation information of the target object corresponding to the target object diagram. It may be understood that, the categories of all the pixel points include the foreground category and the background category. Pixel points belonging to the foreground category are pixel points of the target object, and can form the segmentation information of the target object corresponding to the target object diagram.

S214. Obtain the target object through segmentation of the current image frame according to the segmentation information and the second location information.

In an embodiment, the computer device may map the segmentation information of the target object in the target object diagram and the second location information of the target object key point to the current image frame.

In an embodiment, the computer device may perform, according to an inverse transformation operation of the affine transformation operation performed on the current image frame in step S208, affine transformation on the segmentation information of the target object in the target object diagram and the second location information of the target object key point, to map the segmentation information of the target object in the target object diagram and the second location information of the target object key point to the current image frame.

It may be understood that, in the current image frame to which the segmentation information of the target object and the second location information of the target object key point are mapped, the target object can be evidently distinguished and displayed, that is, the target object is obtained from the current image frame through segmentation.

Because there is no image frame before or prior to the initial image frame, when the current image frame is not the initial image frame, steps S202 to S214 may be performed.

In an embodiment, when the current image frame is the initial image frame, the computer device may perform the target object key point detection on the whole initial image frame, to obtain the location information of the target object key point in the initial image frame, segment the target object from the whole initial image frame, to obtain the segmentation information of the target object, and map the location information of the target object key point in the initial image frame and the segmentation information of the target object to the initial image frame.

In an embodiment, the computer device may alternatively input the whole initial image frame to the multi-task network, perform the target object key point detection on the initial image frame through the key point detection model in the multi-task network, perform semantic segmentation on the initial image frame through the segmentation model in the multi-task network, and output the segmentation information of the corresponding target object.

In an embodiment, before step S202 is performed, the computer device may calculate the location information of the target object key point in the initial image frame, and the segmentation information of the target object in the initial image frame. As a result, when the current image frame is the initial image frame, the location information of the target object key point in the initial image frame, and the segmentation information of the target object in the initial image frame that have been calculated may be directly obtained.

Figure 4:
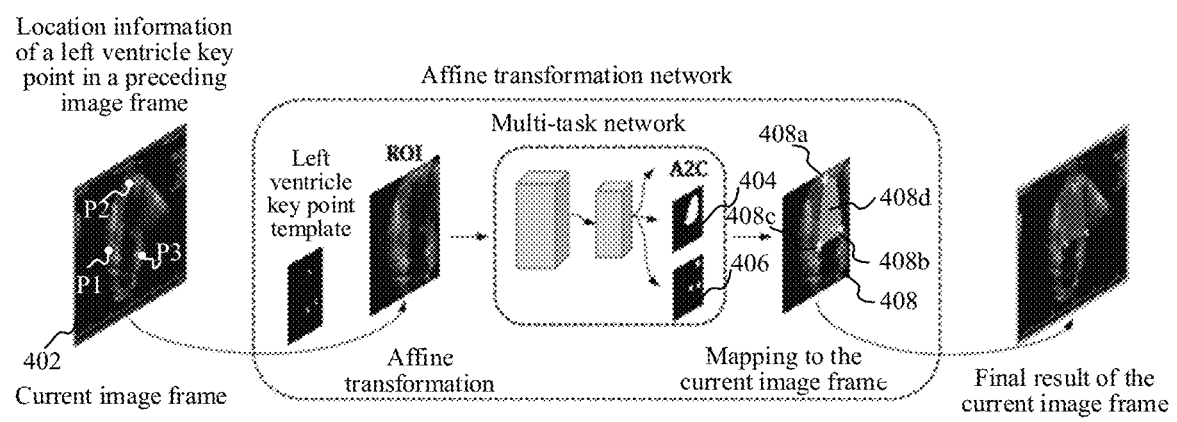
FIG. 4 is a schematic principle diagram of an image segmentation method according to an embodiment.

For ease of understanding, the principle of the image segmentation method is explained and described with reference to FIG. 4. FIG. 4 is described by using an example in which a video is a cardiac ultrasound detection video, an image frame in the video is a cardiac ultrasound section diagram, and a target object is a left ventricle. FIG. 4 is described by using an example in which a preceding image frame of a current image frame serves as a reference image frame, but the reference image frame is not limited to the preceding image frame of the current image frame. With reference to FIG. 4, three points P1 to P3 are left ventricle key points of the preceding image frame on a current image frame 402. The three points on a left ventricle key point template represent left ventricle key points in the left ventricle key point template. The computer device may perform affine transformation on the current image frame according to an affine transformation relationship between first location information of the left ventricle key points (that is, the three points P1 to P3) in the preceding image frame and preset location information of the left ventricle key points in the left ventricle key point template, to obtain a left ventricle diagram (that is, an ROI image in FIG. 4). The computer device may input the ROI image separately to a key point detection model and a segmentation model in a multi-task network, and output segmentation information of a left ventricle in the ROI image, and a white region 404 is the segmentation information of the left ventricle in the ROI image. The computer device further outputs second location information of the left ventricle key points in the ROI image, and locations of the three points 406 represent the second location information of the left ventricle key points in the ROI image. An image 408 may be obtained by mapping the outputted information to the ROI image. Points 408a, 408b, and 408c in the image 408 are the left ventricle key points in the ROI image. For example, the point 408a is a left ventricle top cusp, and the points 408b and 408c are respectively two endpoints of a mitral valve. A region 408d in the image 408 is a left ventricle region obtained through segmentation and represented by the segmentation information. The computer device may map the segmentation information of the left ventricle in the ROI image in the image 408 and the second location information of the left ventricle key point to the current image frame to obtain a final result of the current image frame. The final result of the current image frame is the current image frame to which mapping is performed and from which information related to the left ventricle is detected. It may be seen from the final result of the current image frame in FIG. 4 that, the left ventricle has been distinguished from the current image frame. It may be understood that, an affine transformation network in FIG. 4 is used to represent a network framework involved in a process from affine transformation to detection of the information related to the left ventricle in the left ventricle diagram.

In the foregoing image segmentation method, according to a time sequence, the first location information of the target object key point in the previous reference image frame, and in combination with the affine transformation, the target object diagram can be determined relatively quickly without a large quantity of calculation, thereby increasing the processing speed and saving computing resources. The obtained target object diagram is a region of interest of a target object, and may be diagram in which unrelated image content other than the target object is removed. The key point detection may be performed only on the target object diagram to obtain second location information of the target object key point; and the target object may be segmented from the target object diagram to obtain segmentation information of the target object. The segmentation information and the second location information may be mapped to the current image frame. The target object can be evidently distinguished from the current image frame to which the segmentation information and the second location information are mapped, to implement detection and identification on the target object in the current image frame, and segmentation and key point detection performed based on the target object diagram not only eliminate interference from other unrelated images, but also can reduce a calculation amount.

In an embodiment, when the current image frame is a section diagram, the section diagram has a corresponding section category. Section categories may be classified according to formation types of images in section diagrams. The computer device may further perform section category identification on the target object diagram to obtain a section category of the target object diagram.

In an embodiment, when the current image frame is a cardiac ultrasound section diagram, section categories include at least one of an apical two-chamber view (A2C) and an apical four-chamber view (A4C). In another embodiment, the section categories may further include another category, such as, an apical five-chamber view.

In an embodiment, the multi-task network may further include a section classification model. The computer device may perform section classification on the target object diagram through the section classification model in the multi-task network, to obtain a section category of the current image frame. It may be understood that, when the current image frame is a cardiac ultrasound section diagram, the identified section category of the current image frame can provide a doctor with quite important diagnosis reference information. When the current image frame is another type of section diagram, the identified section category can also provide a particular reference information amount.

In an embodiment, before step S202, the method may include detecting initial location information of the target object key point from an initial image frame of the video; using the initial image frame as a first preceding image frame and the initial location information as first preceding location information, and detecting location information of a target object key point in a first following image frame of the first preceding image frame with reference to the first preceding location information. The method may also include using a second following image frame as a second preceding image frame and the location information of the target object key point in the second following image frame as second preceding location information, and returning to the operation of detecting location information of a target object key point in the second following image frame of the second preceding image frame with reference to the second preceding location information, to perform iteration until location information of a target object key point in a last image frame of the video is obtained. The method may further include using the last image frame as a preceding image frame of the initial image frame, and determining final location information of the target object key point in the initial image frame with reference to the location information of the target object key point in the last image frame.

It may be understood that, there may be no image frame before the initial image frame, and therefore, the computer device may detect the initial location information of the target object key point from the initial image frame. That is, rough key point detection is first performed on the initial image frame, to obtain the initial location information of the target object key point in the initial image frame.

The computer device may detect location information of the target object key point in the second image frame (that is, a following image frame of the initial image frame) in the video with reference to the initial location information of the initial image frame, and then detect location information of the target object key point in the third image frame in the video with reference to the location information of the target object key point in the second image frame, and the rest can be deduced by analogy, to perform iteration until location information of the target object key point in the last image frame in the video is obtained. The computer device may use the last image frame as a preceding image frame of the initial image frame, and determine final location information of the target object key point in the initial image frame with reference to the location information of the target object key point in the last image frame.

In an embodiment, the detecting location information of a target object key point in a following image frame of the preceding image frame with reference to the preceding location information includes: performing affine transformation on the following image frame of the preceding image frame according to an affine transformation relationship between the preceding location information and the target object key point template to obtain a target object diagram in the following image frame; and performing key point detection on the target object diagram in the following image frame, to obtain the location information of the target object key point in the following image frame.

It may be understood that, key point detection is performed on the target object diagram in the following image frame to obtain location information of the target object key point in the target object diagram in the following image frame, and then the location information of the target object key point in the target object diagram in the following image frame is mapped to the following image frame to obtain the location information of the target object key point in the following image frame.

In an embodiment, description is made starting from the initial image frame, affine transformation is performed on the second image frame according to an affine transformation relationship between the initial location information of the initial image frame and the target object key point template, to obtain the target object diagram in the second image frame, key point detection is performed on the target object diagram in the second image frame, to obtain location information of the target object key point in the target object diagram in the second image frame, and then the location information of the target object key point in the target object diagram in the second image frame may be mapped to the second image frame, to obtain location information of the target object key point in the second image frame. Then, affine transformation is performed on the third image frame according to an affine transformation relationship between the location information of the target object key point in the second image frame and the target object key point template, to obtain the target object diagram in the third image frame, key point detection is performed on the target object diagram in the third image frame, to obtain location information of the target object key point in the target object diagram in the third image frame, and then the location information of the target object key point in the target object diagram in the third image frame may be mapped to the third image frame, to obtain location information of the target object key point in the third image frame. The rest can be deduced by analogy, until affine transformation is performed on the last image frame according to an affine transformation relationship between the location information of the target object key point in the penultimate image frame and the target object key point template, to obtain the target object diagram in the last image frame, and key point detection is performed on the target object diagram in the last image frame, to obtain location information of the target object key point in the last image frame.

The computer device may use the last image frame as the preceding image frame of the initial image frame, perform affine transformation on the initial image frame according to an affine transformation relationship between the location information of the target object key point in the last image frame and the target object key point template, to obtain the target object diagram in the initial image frame, and perform key point detection on the target object diagram in the initial image frame, to obtain final location information of the target object key point in the optimized initial image frame.

It may be understood that, when the current image frame is the initial image frame, the computer device may directly obtain the final location information of the target object key point in the optimized initial image frame. The computer device may further perform the target object segmentation on the foregoing obtained target object diagram in the initial image frame, to obtain the segmentation information of the target object in the target object diagram in the initial image frame. The computer device may obtain the target object from the initial image frame through segmenting according to the segmentation information of the target object in the target object diagram in the initial image frame and the location information of the target object key point. For example, the computer device may map the segmentation information of the target object in the target object diagram in the initial image frame and the location information of the target object key point to the initial image frame, to obtain the target object from the initial image frame through segmenting. In an embodiment, the computer device may further perform section classification on the target object diagram in the initial image frame to obtain a section category of the initial image frame.

In the foregoing embodiment, compared with the initial location information of the initial image frame, the final location information of the target object key point in the initial image frame obtained according to the foregoing manner is optimized and more accurate. Therefore, when the reference image frames include the initial image frame, affine transformation is performed on the current image frame with reference to an affine transformation relationship between the final location information of the target object key point in the initial image frame and the target object key point template, to enable the obtained target object diagram of the current image frame to be more accurate. Then, the segmentation information of the target object in the target object diagram and the second location information of the target object key point that are subsequently obtained are more accurate, and therefore mapping of more accurate segmentation information and location information of the target object key point in the current image frame enables information related to the target object image in the current image frame to be more accurate.

In an embodiment, step S204 includes determining, in ascending order of distances from the current image frame, a preset quantity of image frames in the video before the current image frame as reference image frames. Step S214 includes averaging, based on determining that there are a plurality of reference image frames, segmentation information of the target object determined according to first location information of the target object key point in each reference image frame, to obtain final segmentation information of the target object; calculating an average value of second location information determined according to the first location information of the target object key point in each reference image frame, to obtain final second location information of the target object key point; and mapping the final segmentation information of the target object and the final second location information of the target object key point to the current image frame.

The preset quantity of image frames may include one or more images before the current image frame.

When there are a plurality of reference image frames, the computer device may perform steps S206 to S210 for each reference image frame. That is, the computer device may perform affine transformation on the current image frame with reference to an affine transformation relationship between first location information of the target object key point in each reference image frame and the target object key point template, to obtain a target object diagram of the current image frame. It may be understood that, the quantity of reference image frames corresponds to the number of times the affine transformation performed on the current image frame, and a corresponding quantity of target object diagrams of the current image frame may be obtained. In addition, key point detection is performed on each target object diagram to obtain second location information of the target object key point, and a target object is obtained from the target object diagram through segmentation to obtain segmentation information of the target object. As a result, there are a plurality of pieces of second location information of the target object key point and a plurality of pieces of segmentation information of the target object.

Additionally, the computer device may calculate an average, based on determining that there are a plurality of reference image frames, of segmentation information of the target object determined according to first location information of the target object key point in each reference image frame to obtain final segmentation information of the target object; and calculate an average value of second location information determined according to the first location information of the target object key point in each reference image frame to obtain final second location information of the target object key point. The computer device may map the final segmentation information of the target object and the final second location information of the target object key point to the current image frame.

In an embodiment, the preset quantity may be two or more, and the reference image frames may include, for example, a first preceding image frame and a second preceding image frame of the current image frame. Then, the computer device may perform steps S206 to S210 according to each of the first location information of the target object key point in the first preceding image frame of the current image frame and the first location information of the target object key point in the second preceding image frame, to finally obtain two types of segmentation information of the target object and two types of second location information of the target object key point. The computer device may calculate an average of the two types of segmentation information of the target object, and an average of the two types of second location information of the target object key point, to obtain final segmentation information of the target object and final second location information of the target object key point. The computer device may map the final segmentation information of the target object and the final second location information of the target object key point to the current image frame.

Figure 5:
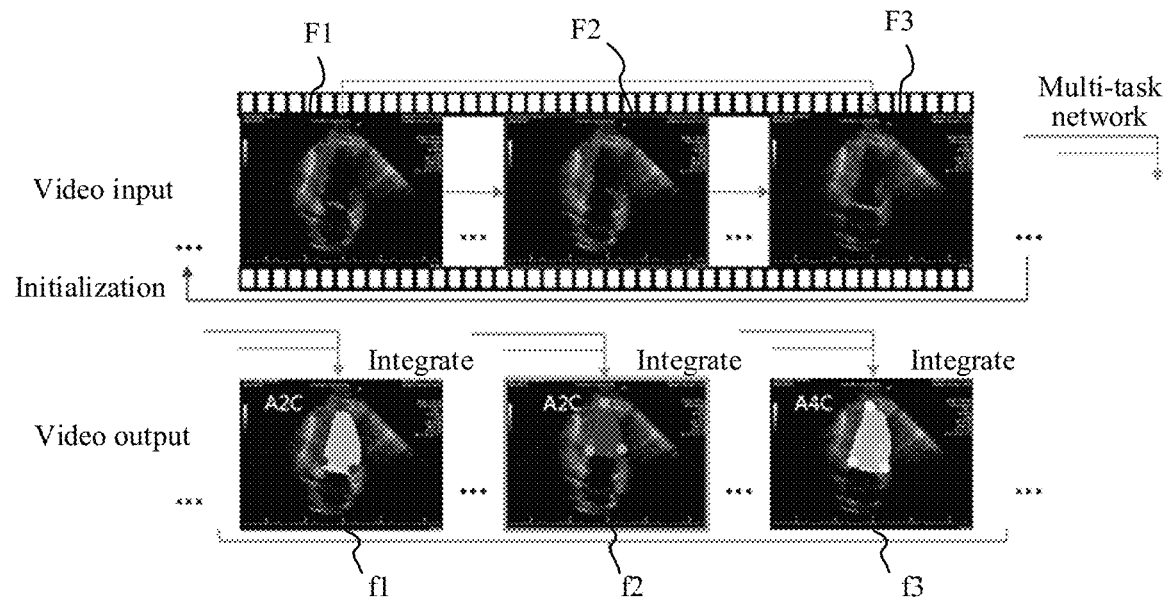
FIG. 5 is a schematic principle diagram of multi-time-sequence detection according to an embodiment.

FIG. 5 is a schematic principle diagram of multi-time-sequence processing according to an embodiment. That is, a schematic principle diagram of segmenting a target object in a current image frame by using first location information of a target object key point in a plurality of image frames in front in a time sequence. FIG. 5 is described by using an example in which a video is a cardiac ultrasound detection video, an image frame in the video is a cardiac ultrasound section diagram, and a target object is a left ventricle. With reference to FIG. 5, a video is input. An initial image frame F1 has no location information of a left ventricle key point in an earlier frame. Therefore, rough left ventricle key point detection may be performed on the initial image frame F1 by using a multi-task network, location information of a detected left ventricle key point is used as time sequence affine transformation information of a next frame, and affine transformation is performed on a following image frame F2 with reference to an affine transformation relationship between the location information of the left ventricle key point and a left ventricle key point template, to obtain a corresponding left ventricle diagram; then key point detection is performed on the left ventricle diagram thereof, the location information of the detected left ventricle key point is mapped to the following image frame F2, then location information of the left ventricle key point in F2 after mapping is used as time sequence affine transformation information of a second following image frame F3, and affine transformation and subsequent processing are performed on the image frame F3, to obtain corresponding location information of the left ventricle key point; and the rest can be deduced by analogy, until key point information of the last image frame in the video is obtained. As shown by an arrow with "Initialization" in FIG. 5, the location information of the left ventricle key point in the last image frame is returned to serve as affine transformation reference information of the initial image frame of the video, affine transformation is performed on the initial image frame, to obtain the corresponding left ventricle diagram, and then based on the left ventricle diagram of the initial image frame, optimized and relatively reliable final location information of the left ventricle key point in the initial image frame is calculated. Based on the optimized final location information of the left ventricle key point in the initial image frame, the current image frame is sequentially selected according to a time sequence. When the current image frame is the initial image frame, the final location information of the left ventricle key point in the initial image frame may be directly obtained, segmentation information of the left ventricle in the initial image frame is determined according to the foregoing left ventricle diagram of the initial image frame, and the final location information of the left ventricle key point in the initial image frame and the segmentation information of the left ventricle are mapped to the initial image frame. When the current image frame is the second image frame, there is only the initial image frame before the second image frame. Therefore, the left ventricle diagram of the second image frame may be determined with reference to the final location information of the left ventricle key point in the initial image frame, key point detection is performed on the left ventricle diagram, the left ventricle is segmented from the left ventricle diagram, and the obtained segmentation information and the second location information are mapped to the second image frame. When the current image frame is the third image frame or an image frame after the third image frame, two reference image frames may be selected in ascending order of distances from the current image frame. As shown in FIG. 5, when the third image frame F3 is the current image frame, by using the initial image frame F1 and the second image frame F2 as reference image frames and in combination with to the multi-task network, second location information determined respectively according to the first location information of the left ventricle key point in the initial image frame and the second image frame is averaged, and segmentation information of the left ventricle determined respectively according to the first location information of the left ventricle key point in the initial image frame and the second image frame is averaged. Then, the final segmentation information of the left ventricle and the final second location information of the left ventricle key point that are obtained are integrated and mapped to the third image frame F3. Moreover, a section category of each current image frame may be further determined. As shown in FIG. 5, images after mapping to F1 to F3 are respectively f1 to f3, three points in f1 to f3 are left ventricle key points, a highlighted region in which the 3 left ventricle key points are endpoints is a left ventricle region represented by segmentation information of the left ventricle, and A2C and A4C are section categories.

In the foregoing embodiment, through an intimacy relationship with the current image frame, a plurality of reference image frames are selected forward as affine transformation reference information of the current image frame, thereby ensuring source diversification of the affine transformation reference information of the current image frame, and reducing misleading of information missing of a single reference image frame on a subsequent result, to improve accuracy.

In an embodiment, the method further includes: inputting the target object diagram to a multi-task network, and encoding the target object diagram to obtain a feature map of the target object diagram. Step S210 includes performing key point detection on the feature map through a key point detection model in the multi-task network, and outputting the second location information of the target object key point corresponding to the target object diagram. Step S212 includes performing semantic segmentation on the feature map through a segmentation model in the multi-task network, and outputting the segmentation information of the corresponding target object.

The multi-task network is a network that can perform a plurality of processing tasks in parallel. The multi-task network may include the key point detection model and the segmentation model. The key point detection model is a machine learning model used for detecting the target object key point. The segmentation model is a machine learning model used for obtaining the target object through segmenting.

The feature map is a feature map obtained after an image and a filter are convoluted. It may be understood that, compared with the original image, the feature map has features extracted, and can better highlight image features.

In an embodiment, the multi-task network may further include a lightweight encoding model. The computer device may input the target object diagram to the encoding model in the multi-task network, and perform encoding on the target object diagram to obtain a feature map of the target object diagram. In an embodiment, the lightweight encoding model may include, for example, MobileNetV2. However, the lightweight encoding model is not limited thereto, and may include other encoding models that are capable of encoding the target object diagram.

In an embodiment, the computer device may perform, through the key point detection model and by using the L1-norm loss function, a regression to obtain the second location information of the target object key point corresponding to the target object diagram.

Figure 6:
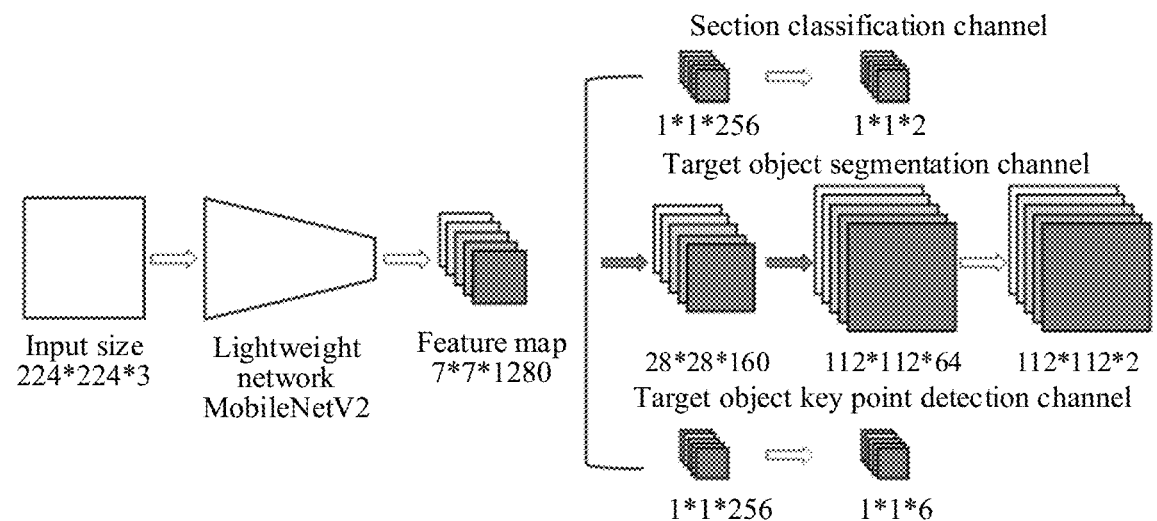
FIG. 6 is a schematic structural diagram of a multi-task network according to an embodiment.

FIG. 6 is a schematic structural diagram of a multi-task network according to an embodiment. With reference to FIG. 6, an inputted 224*224*3 image is a target object diagram (ROI image), and is encoded through a lightweight network MobileNetV2, to output a 7*7*1280 feature map. Subsequently, the feature map is separately inputted to 3 different task channels, that is, separately inputted to a section classification channel, a target object segmentation channel, and a target object key point detection channel, and subject to three different types of detection in parallel. As shown in FIG. 6, a section classification model in the section classification channel processes the feature map to finally obtain a binary classification result of section categories. A key point detection model in the target object key point detection channel performs regression processing to output X coordinate information and Y coordinate information of 3 target object key points, and therefore 6 location parameters of location information of the target object key points may be obtained. Secondary decoding is performed through the segmentation model in the target object segmentation channel, to obtain categories of all pixel points in a decoded image, and the categories of the pixel points include a foreground category and a background category. It may be understood that, pixel points belonging to the foreground category are the foreground, and pixel points belonging to the background category are the background. The size of the outputted decoded image is 112*112 that is ½ of the size of the inputted target object diagram. Therefore, the decoded image may continue to be interpolated, to cause the size thereof and the size of the inputted target object diagram to be consistent and be 224*224, and then segmentation information of a target object corresponding to the target object diagram is formed according to the pixel points in the interpolated decoded image that belong to the foreground category.

In the foregoing embodiment, the target object diagram is encoded through the multi-task network to obtain the feature map. The feature map can more accurately express feature information of the target object diagram. Then, the feature map is processed through the key point detection model and the segmentation model in the multi-task network simultaneously, thereby improving efficiency of detecting the information of the target object image, and achieving relatively high real-time performance. Moreover, the multi-task network may be lightweight, that is, a small network may be used to achieve the level of accuracy of a large network.

In an embodiment, the method further includes performing section classification on the feature map through a section classification model in the multi-task network to obtain a section category of the current image frame.

It may be understood that, the multi-task network further includes a section classification model. The section classification model is a model used for detecting a section category of an image.

It may be understood that, the section classification model outputs a section category of the target object diagram. Because the target object diagram is extracted from the current image frame, the section category of the target object diagram is the section category of the current image frame.

In an embodiment, the computer device may use a cross entropy loss algorithm through the section classification model to obtain the section category of the current image frame.

In an embodiment, the method further includes determining, after a section category of each image frame in the video is determined, a quantity of image frames corresponding to each section category; and taking a section category corresponding to a largest quantity of image frames as a section category corresponding to the video.

It may be understood that, according to an embodiment, a section category corresponding to a largest quantity of image frames is taken as a section category corresponding to the video. However, the one or more embodiments of the disclosure are not limited thereto, and a section category may be determined according to other methods, such as designating priority to each section category.

One or more exemplary embodiments are provided with reference to FIG. 5. In FIG. 5, image frames f1 and f2 are classified as belonging to a section category A2C, while f3 is classified as belonging to a section category A4C. Here, it is noted that different image frames in the same video may be classified into different section categories (e.g., image frames f1 and f3) and/or classified into the same section category (e.g., image frames f1 and f2). In FIG. 5, the category A2C has a largest quantity of image frames, and therefore, it may be determined that the section category of the video is A2C, instead of A4C.

In the foregoing embodiment, the section category of the video can be further identified, which is equivalent to that of segmentation of the target object in the video and identification of the standard section can be completed at the same time, thereby providing a larger information amount for subsequent processing more quickly. Moreover, as described above, a section category including the largest quantity of image frames may be used as a section category corresponding to the video. Accordingly, the accuracy of the determined section category can be improved, and more accurate reference information can be provided for subsequent processing.

In an embodiment, the performing of the key point detection on the feature map through a key point detection model in the multi-task network includes: inputting the feature map to the pre-trained key point detection model, and outputting a location information difference between the target object key point in the target object diagram and the target object key point in the target object key point template; and adding preset location information of the target object key point in the target object key point template and the location information difference, to obtain the second location information of the target object key point in the target object diagram.

In an embodiment, the computer device may extract a target object diagram in an example image frame in advance, and perform machine learning training according to the target object diagram in the example image frame and with reference to a labeled example location difference between a target object key point in the target object diagram and a target object key point in a target object key point template, to obtain a key point detection model. Therefore, after a feature map is inputted to the key point detection model, a location information difference between the target object key point in the target object diagram and the target object key point in the target object key point template may be outputted.

In the foregoing embodiment, a location information difference between the target object key point in the target object diagram and the target object key point in the target object key point template is outputted through the key point detection model; and preset location information of the target object key point in the target object key point template and the location information difference are added, to obtain the second location information of the target object key point in the target object diagram. The location information difference has a smaller data amount than that of complete location information, thereby reducing processing load and saving computing resources.

In an embodiment, the performing of the semantic segmentation on the feature map through a segmentation model in the multi-task network, and outputting the segmentation information of the corresponding target object includes: inputting the feature map to the pre-trained segmentation model and performing decoding, and outputting a first classification probability and a second classification probability of each pixel point in an obtained decoded image belonging to a foreground category and a background category; selecting, for each pixel point in the decoded image, a category corresponding to a larger classification probability of the first classification probability and the second classification probability corresponding to the pixel point as a category of the pixel point; and determining, according to pixel points in the decoded image that belong to the foreground category, the segmentation information of the target object corresponding to the target object diagram.

It may be understood that, the segmentation model may predict a classification probability that each pixel point in the decoded image belongs to the foreground category or the background category.

When the size of the decoded image and the size of the target object diagram are consistent, the segmentation information of the target object corresponding to the target object diagram may be obtained directly according to pixel points in the decoded image that belong to the foreground category.

The size of the decoded image may be inconsistent with the size of the target object diagram. When the size of the decoded image is less than the size of the target object diagram, the decoded image may be interpolated, to cause the size thereof and the size of the inputted target object diagram to be consistent, and then segmentation information of a target object corresponding to the target object diagram is formed according to the pixel points in the interpolated decoded image that belong to the foreground category.

In the foregoing embodiment, a category of each pixel point is determined through the segmentation model, and then segmentation is implemented, thereby refining the segmentation granularity, and improving segmentation accuracy.

In an embodiment, operations of training the segmentation model include: obtaining example image frames (or sample image frames) in an example video (or a sample video); obtaining first target object segmentation labels respectively corresponding to the example image frames; and inputting the example image frames and the corresponding first target object segmentation labels to an initial segmentation model, and performing iterative machine learning training to obtain a basic segmentation model (or an initial segmentation model).

The example video (or sample video) is a video used as training data to train the machine learning model. The example image frame (or sample image frame) is an image frame in the training video used for training the machine learning model. In training the machine learning model, one or more example videos may be used.

It may be understood that, the training data may include the example video, and a first target object segmentation label corresponding to each example image frame in the example video. The first target object segmentation label is used to label a target object outline in the corresponding example image frame.

It may be understood that, the first target object segmentation label may be a manually added label. The first target object segmentation label may perform labeling in a mask image of the example image frame. Inputting the first target object segmentation label to the initial segmentation model is equivalent to inputting the mask image of the example image frame to the initial segmentation model. Labeling the mask image of the example image frame with the first target object segmentation label is equivalent to labeling the target object outline in the example image frame.

The computer device may input the example image frames and the corresponding first target object segmentation labels to a preset initial segmentation model, and perform iterative machine learning training, to obtain a basic segmentation model.

It may be understood that, the computer device may input the target object diagram or the feature map of the target object diagram to the basic segmentation model, and perform target object segmentation, to obtain segmentation information of the target object diagram.

The computer device may further optimize and adjust the segmentation model to improve accuracy of the segmentation model, and perform the target object segmentation on the target object diagram or the feature map of the target object diagram based on the optimized segmentation model.

In an embodiment, steps of training the segmentation model may further include a step of optimizing and adjusting the basic segmentation model, and the optimization and adjustment step may include the following steps: sequentially selecting current example image frames from the example image frames; for each current example image frame, selecting, from a label outline formed by a first target object segmentation label of a preceding example image frame of the current example image frame, a preset quantity of boundary feature points representing a target object boundary; tracking location information of the boundary feature points in the current example image frame through an optical flow tracking operation; connecting the location information of the boundary feature points in the current example image frame and performing smoothing, to obtain a second target object segmentation label of the current example image frame; and performing iterative optimization and training on the basic segmentation model according to each example image frame and a corresponding second target object segmentation label, to obtain an optimized segmentation model.

In an embodiment, in the process of training the segmentation model, the computer device may sequentially select current example image frames from the example image frames; and for each current example image frame, select, from a label outline formed by a first target object segmentation label of a preceding example image frame of the current example image frame, a preset quantity of boundary feature points representing a target object boundary.

The boundary feature points are feature points that can represent the target object boundary. In an embodiment, the computer device may evenly select, from a label outline formed by a first target object segmentation label of a preceding example image frame of the current example image frame, a preset quantity of points as boundary feature points. For example, the computer device may evenly select, from a label outline formed by a first target object segmentation label of a preceding example image frame, 20 points as boundary feature points.

It may be understood that, because an ultrasound image has blurred edges and a large quantity of artifacts, evenly selecting a preset quantity of points on a label outline as boundary feature points of the target object can avoid interference from noise, such as blurred edges and artifacts, thereby improving calculation accuracy.

Further, the computer device may track location information of the selected boundary feature points in the current example image frame through an optical flow tracking operation and by using an optical flow algorithm. It may be understood that, the location information of the tracked boundary feature points in the current example image frame is equivalent to formation of new boundary feature points. The computer device may connect the location information of the boundary feature points in the current example image frame and perform smoothing. That is, this is equivalent to connecting new boundary feature points formed through tracking, and forming a label outline through curve fitting, to obtain the second target object segmentation label of the current example image frame (that is, obtain a new target object segmentation label).

The second target object segmentation label is not a manually added label, but a label generated by performing tracking through an optical flow algorithm and used for labeling the target object outline in the example image frame.

The computer device may input, to the basic segmentation model, each example image frame and the second target object segmentation label generated through optical flow tracking, and perform iterative model optimization and training, to obtain an optimized segmentation model.

It may be understood that, the optical flow algorithm may be used for tracking an optical flow, and may alternatively track the entire target object. However, the optical flow algorithm has some requirements for image quality, but a video image may have rich artifacts and a blurred boundary, which greatly misleads the tracking structure of the optical flow algorithm. For example, when the video is an ultrasound video, if the entire target object is tracked, hyperemia, artifacts and a blurred boundary in the target object region inevitably generate a relatively large tracking error. Moreover, the tracking of the entire target object may require a time consuming process. In this embodiment, boundary feature points (that is, key points located on the target object outline) of the target object are selected from the label outline and tracked because compared with points in the target object, points on the outline have more image contrast information, evident features, and a smaller tracking error. Moreover, since less points are tracked, the calculation amount is reduced and the speed of tracking feature points may be faster.

In this embodiment, optical flow tracking only occurs between two frames. Therefore, without adding labeling information of the target object outline key point to each example image frame, boundary feature points selected from a preceding example image frame can be tracked, thereby avoiding manually labeling the boundary feature points.

Additionally, because this embodiment avoids adding the labeling information of the target object outline key point, tracking of the optical flow between two frames belongs to an operation of generating a label in an online training model, and derivable implementation of the optical flow algorithm does not need to be considered, the implementation is simple and easily operable. In addition, this is equivalent to learning the optical flow tracking algorithm whiling training the model, so that the network model itself has an optical flow tracking capability. Therefore, in a test process, the network can consider smoothing segmentation label information of the target object in a previous frame through optical flow tracking whiling obtaining the target object in the current frame through segmentation, to obtain a smoother result.

It may be understood that, this embodiment can automatically generate a segmentation label, and therefore is quite applicable to semi-supervised learning, and particularly applicable to a video lack of manual labeling. In this embodiment, by using an indirect method, the optical flow algorithm is extended to generation of a segmentation label, thereby automatically adjusting and optimizing the segmentation model and implementing end-to-end training, so that the timeliness is improved, and implementation is easier.

In an embodiment, the method further includes: mining a hard example pixel point in the current example image frame through the basic segmentation model; and removing a pixel point other than the hard example pixel point and a target object pixel point from the current example image frame. In this embodiment, the performing iterative optimization and training on the basic segmentation model according to each example image frame and a corresponding second target object segmentation label may include: inputting each example image frame having a pixel point removed and a corresponding second target object segmentation label to the basic segmentation model, and performing iterative model optimization and training.

It may be understood that, hard examples are mined selectively and inputted to the segmentation model together with the target object pixel points, so that hard example pixel points on edges can be trained in a targeted manner. Accordingly, the resources may be more efficiently allocated in a target manner and the identification capability of the segmentation model on the edges can be improved, thereby enabling edges obtained by segmenting the optimized segmentation model to be smoother.

The basic segmentation model is the foregoing segmentation model obtained by performing iterative machine learning training through a first target object segmentation label. The hard example pixel point is a background pixel point that is prone to being classified incorrectly. Generally, the hard example pixel points are located at boundary regions or at an edge of an image and a target object segmentation edge.

It may be understood that, the target object pixel points may be foreground pixel points. The background pixel points are pixel points other than the target object pixel points.

In an embodiment, the mining a hard example pixel point in the current example image frame through the basic segmentation model includes: inputting an example image frame having a corresponding second target object segmentation label to the basic segmentation model, to obtain segmentation losses of pixel points in the example image frame; and selecting, from the example image frame in descending order of the segmentation losses, background pixel points whose quantity matches a quantity of target object pixel points in the example image frame, to obtain hard example pixel points. Therefore, the hard example pixel points are background pixel points that are classified incorrectly.

The segmentation loss is used to represent a difference between a predicted value and an actual value. A larger difference between the two indicates a larger segmentation loss, and a smaller difference between the two indicates a smaller segmentation loss.

It may be understood that, the basic segmentation model has been provided with a segmentation capability to some extent. Therefore, if each example image frame having a corresponding second target object segmentation label is inputted to the basic segmentation model, the target object segmentation can be performed on each example image frame, to obtain segmentation information of the target object in each example image frame. After being connected and smoothed, the location information of the boundary feature points tracked through an optical flow in the current example image frame is equivalent to formation of the second target object segmentation label. Therefore, the second target object segmentation label is equivalent to being capable of representing an actual value in the example image frame, that is, pixel points in the example image frame that are located inside an outline formed by the second target object segmentation label are the target object pixel points, and pixel points located outside the outline are background pixel points. The obtained segmentation information of the target object in each example image frame can represent a predicted value in each example image frame, that is, pixel points located inside the target object region obtained through segmentation are the target object pixel points, and pixel points located outside the target object region are background pixel points. Therefore, the computer device may determine an actual value of each pixel point in the example image frame through the second target object segmentation label, determine a predicted value of the pixel point in the example image frame through the segmentation information of the target object, in the example image frame, obtained by performing segmentation through the basic segmentation model, and compare the predicted value and the actual value, to obtain a segmentation loss of each pixel point in the example image frame.

In an embodiment, the computer device may select, from the example image frame in descending order of the segmentation losses of the background pixel points. The background pixel points for which a quantity matches a quantity of target object pixel points in the example image frame, may be obtained as hard example pixel points. It may be understood that, matching the quantity of the target object pixel points is not limited to a case in which the quantity of the background pixel points needs to be completely consistent with the quantity of the target object pixel points, provided that a difference between the quantity of the background pixel points and the quantity of the target object pixel points falls within a preset balance range, that is, the difference between the two quantities is not excessively large, to avoid performing a large quantity of unnecessary calculation. For example, if the quantity of target object pixel points is 100, background pixel points whose segmentation losses are ranked top 100 may be selected from the background pixel points, to obtain 100 hard example pixel points. If the balance range is a range interval of ±20, 80 to 120 background pixel points may be selected in descending order of the segmentation losses of the background pixel points as hard example pixel points.

The computer device may remove a pixel point other than a corresponding hard example pixel point and a target object pixel point from each example image frame.

The computer device may input, to the basic segmentation model, each example image frame having a pixel point removed and the corresponding second target object segmentation label, and perform iterative model optimization and training, to obtain an optimized segmentation model.

It may be understood that, the computer device may mine hard example pixel points through an online hard example mining (OHEM) algorithm.

Figure 7:
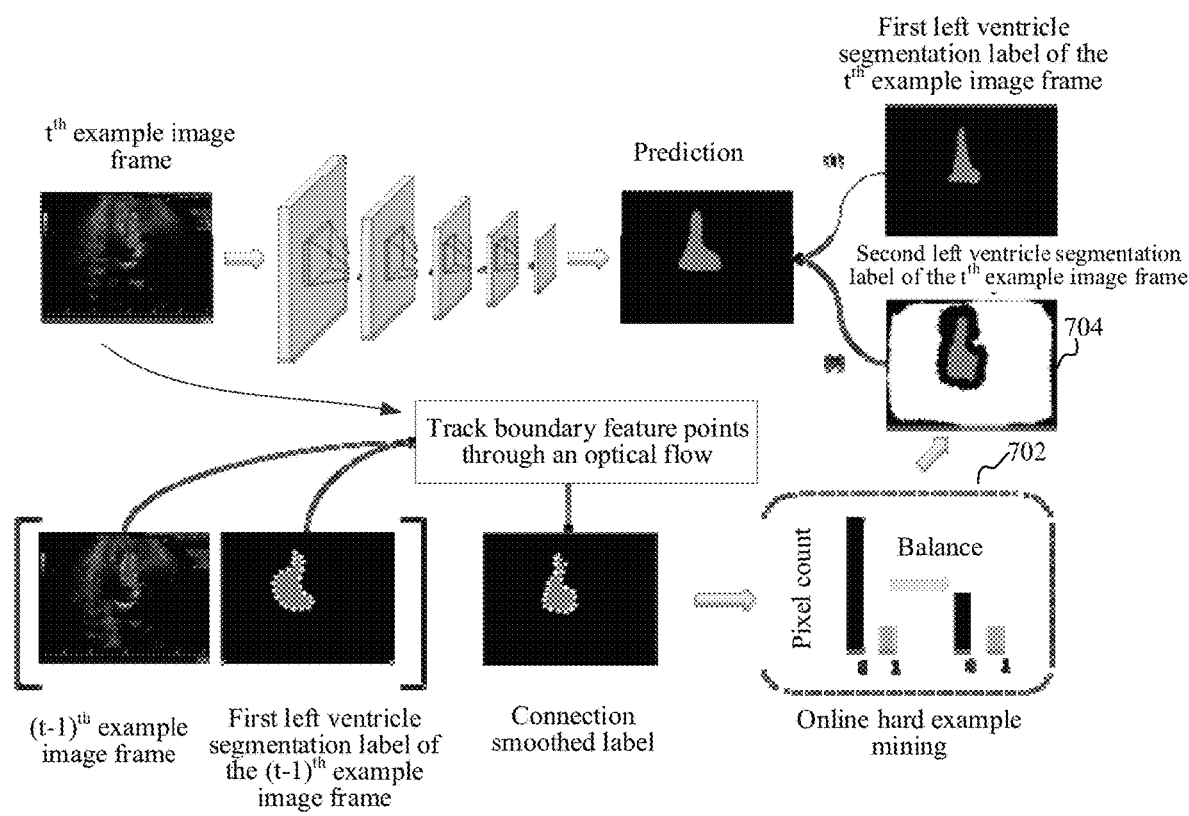
FIG. 7 is a diagram illustrating a method for adaptively training a segmentation model for segmenting a smooth edge according to an embodiment.

FIG. 7 shows a method for adaptively training a segmentation model for segmenting a smooth edge according to an embodiment. FIG. 7 is described by using an example in which a video is a cardiac ultrasound detection video, an image frame in the video is a cardiac ultrasound section diagram, and a target object is a left ventricle. Therefore, the first target object segmentation label is the first left ventricle segmentation label, and the second target object segmentation label is the second left ventricle segmentation label. With reference to FIG. 7, the first left ventricle segmentation label is manually labeled. Therefore, machine learning training may be first performed according to the first left ventricle segmentation label for performing manual labeling for each example image frame and by using a corresponding example image frame as example data, to obtain the basic segmentation model through training, that is, perform ①. In the process of training the segmentation model, the computer device may evenly select, as boundary feature points, a preset quantity of points from a label outline represented by the first left ventricle segmentation label of the $(t-1)^{th}$ example image frame, track location information of the boundary feature points in the $t^{th}$ example image frame through the Lucas-Kanade (LK) optical flow algorithm, and then connect the location information of the boundary feature points in the $t^{th}$ example image frame and perform smoothing to obtain a connection smoothed label, that is, the second left ventricle segmentation label. A dark-colored histogram in 702 represents background pixel points, a light-colored histogram represents left ventricle pixel points (that is, foreground pixel points), and a left group of histograms in 702 represent quantities of background pixel points and left ventricle pixel points in the $t^{th}$ example image frame when segmentation is performed by using the second left ventricle segmentation label. It can be learned that, the background pixel points are evidently greater than the left ventricle pixel points, and therefore balance processing needs to be performed. Pixel points other than hard example pixel points and left ventricle pixel points are removed from the $t^{th}$ example image frame, thereby reducing an unnecessary calculation amount of excessive background pixel points. The right group of histograms represent quantities of hard example pixel points and left ventricle pixel points in the $t^{th}$ example image frame having pixel points removed. It is evidently seen from the right histogram that the quantities of background pixel points and left ventricle pixel points are relatively balanced, and cannot go so far as to have an excessively large difference. A mask image of the $t^{th}$ example image frame having pixel points removed is 704. It can be learned that 704 still includes the second left ventricle segmentation label of the $t^{th}$ example image frame. Then, each example image frame having a pixel point removed and a corresponding second left ventricle segmentation label may be inputted to the basic segmentation model, that is, ② is performed, and iterative model optimization and training are performed. FIG. 7 is used for only exemplification, but not used for limitation.

In the foregoing embodiment, in the model training process, by automatically performing, through a computer, optical flow tracking to generate a new target object segmentation label, that is, the second target object segmentation label, the segmentation model can be adaptively optimized in combination with hard example mining, and the optimization effect can be automatically achieved in the model training process, thereby reducing a large quantity of laborious test operations. Moreover, in the method for adaptively training a segmentation model for segmenting a smooth edge, only points on a label outline formed by the target object segmentation label are selected to perform optical flow tracking, that is, optical flow tracking is locally performed, and therefore no huge calculation amount is required, thereby saving computing resources.

In an embodiment, operations of generating the target object key point template include: expanding a label outline formed by a first target object segmentation label of each example image frame in an example video to a preset range; enlarging each expanded range according to a location law of the target object in a cardiac ultrasound section diagram of a preset section category to obtain a tailoring range; performing tailoring from each of the example image frames to obtain a tailored picture matching the tailoring range; averaging location information of the target object key point in each tailored picture to obtain preset location information of the target object key point; and generating the target object key point template according to the preset location information of the target object key point.

It may be understood that, there may be one or more example videos, and each example image frame in each example video has a corresponding first target object segmentation label. The target object segmentation label is a label used for representing an external outline of the target object.

A difference exists between sizes of target object regions in cardiac ultrasound section diagrams of different section categories, while the target object key point template is uniformly applicable to cardiac ultrasound section diagrams of all section categories. Therefore, to be universally applicable to all section categories, the computer device may expand a label outline formed by the corresponding first target object segmentation label in each example image frame to a preset range, and a region within a label outline formed after expansion to the preset range can basically cover target object regions in cardiac ultrasound section diagrams of all different section categories. Therefore, the region within the label outline formed after expansion to the preset range may be roughly used as the location of the target object.

In an embodiment, the computer device may find the location law of the target object in section diagrams of preset different section categories, and enlarge an expanded range in each example image frame to obtain a tailoring range. The expanded range is enlarged to determine the tailoring range, while the label outline formed by the first target object segmentation label is not expanded again. It may be understood that, when the expanded range is enlarged, the label outline formed by the first target object segmentation label is not expanded again, and instead, a range slightly larger than the range formed by the label outline is selected as the tailoring range based on the location law of the target object in the section diagrams of the preset different section categories. The tailoring range covers the range formed by the label outline.

In an embodiment, when the target object is the left ventricle, the location law of the left ventricle in the section diagrams of the preset different section categories is that the left ventricle is located at an upper left corner of the cardiac ultrasound section diagram. Based on the expanded range, the computer device may enlarge the width and the height of the left ventricle by 50% respectively toward the left and the bottom of the example image frame, to obtain a tailoring range. It may be understood that, besides covering the left ventricle region, the enlarged tailoring range can further include more information used for determining a section category.

The computer device may perform tailoring from each of the example image frames to obtain a tailored picture matching the tailoring range. In this way, a plurality of tailored pictures may be obtained. It may be understood that, the quantity of example image frames is the same as the quantity of tailored pictures. In an embodiment, the computer device may adjust a size of a picture obtained by performing tailoring according to the tailoring range, to a size matching the input size of the multi-task network, and the size-adjusted picture is used as a tailored picture.

The computer device may average location information of the target object key points in all tailored pictures, to obtain preset location information of the target object key point; and generate the target object key point template according to the preset location information of the target object key point.

In an embodiment, for each tailored picture, the computer device may determine a target object key point represented by the first target object segmentation label in the tailored picture, and determine location information of the target object key point in the tailored picture. The computer device may average location information of the target object key points in all tailored pictures, to obtain preset location information of the target object key point.

It may be understood that, example videos belonging to different section categories may be used as training data, and therefore example image frames also correspond to a plurality of section categories. The target object key point template determined based on example image frames of different section categories can be used for detecting image frames of a plurality of different section categories.

Figure 8:
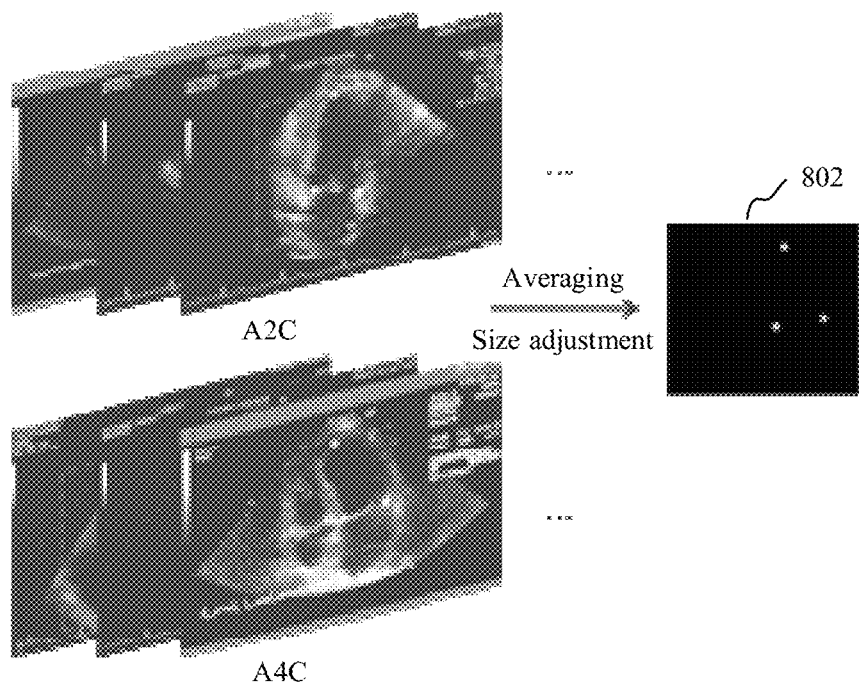
FIG. 8 is a schematic principle diagram of generating a target object key point template according to an embodiment.

FIG. 8 is a schematic principle diagram of generating a target object key point template according to an embodiment. FIG. 8 is described by using an example in which an image frame in the video is a cardiac ultrasound section diagram, and a target object is a left ventricle. Then, the left ventricle key point template is the target object key point template to be generated. With reference to FIG. 8, cardiac ultrasound section diagrams of different section categories A2C and A4C are used as basic data for generating the left ventricle key point template, and the following series of processing may be performed: expanding a label outline of a left ventricle in each cardiac ultrasound section diagram serving as an example image frame to a specific range, enlarging the expanded range according to the location law of the left ventricle in different categories of section diagrams to obtain a tailoring range, then capturing an image according to the tailoring range and adjusting the image to a tailored picture having a size matching the input size of the multi-task network, and averaging location information of a left ventricle key point in all tailored pictures to obtain preset location information of the left ventricle key point. The left ventricle key point template 802 is finally generated according to the preset location information of the left ventricle key point.

In the foregoing embodiment, the location information of the target object key point determined through the foregoing method is averaged, thereby improving accuracy and applicability of the target object key point template. Then, an accurate reference basis is provided for subsequent affine transformation.

Figure 9:
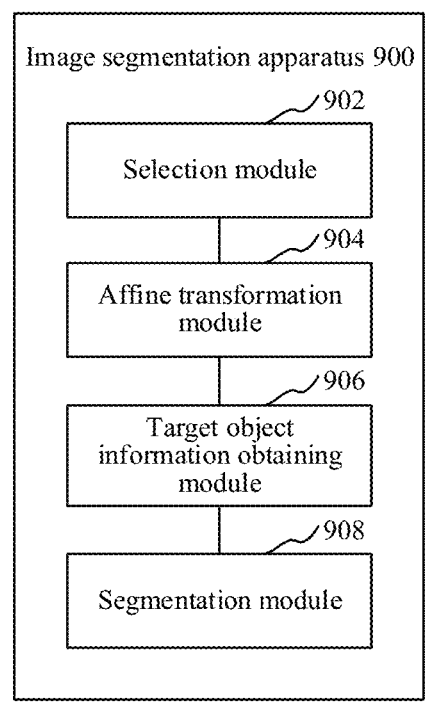
FIG. 9 is a block diagram of an image segmentation apparatus according to an embodiment.

FIG. 9 is a block diagram illustrating an image segmentation apparatus 900 according to an embodiment. The apparatus 900 may include a selection module 902, an affine transformation module 904, a target object information obtaining module 906, and a segmentation module 908.

The selection module 902 is configured to sequentially select a current image frame according to a time sequence in a video.

The affine transformation module 904 is configured to determine a reference image frame from among image frames before the current image frame in the time sequence in the video; obtain first location information of a target object key point in the reference image frame; and perform affine transformation on the current image frame with reference to an affine transformation relationship between the first location information and a target object key point template, to obtain a target object diagram of the current image frame.

The target object information obtaining module 906 is configured to perform key point detection on the target object diagram, to obtain second location information of the target object key point; and segment a target object from the target object diagram to obtain segmentation information of the target object.

The segmentation module 908 is configured to obtain the target object through segmentation from the current image frame according to the segmentation information and the second location information.

Figure 10:
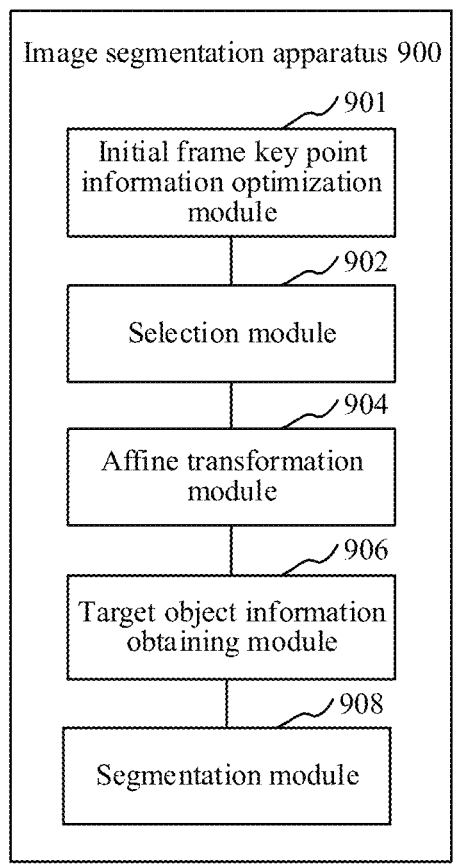
FIG. 10 is a block diagram of an image segmentation apparatus according to another embodiment.

FIG. 10 is a block diagram illustrating an image segmentation apparatus 900 according to another embodiment. Here, the apparatus 900 may further include an initial frame key point information optimization module 901 configured to detect initial location information of the target object key point from an initial image frame of the video; use the initial image frame as a preceding image frame and the initial location information as preceding location information, and detecting location information of a target object key point in a following image frame of the preceding image frame with reference to the preceding location information; use the following image frame as a preceding image frame and the location information of the target object key point in the following image frame as preceding location information, and return to the operation of detecting location information of a target object key point in a following image frame of the preceding image frame with reference to the preceding location information, to perform iteration, until location information of a target object key point in a last image frame of the video is obtained; and take the last image frame as a preceding image frame of the initial image frame, and determine final location information of the target object key point in the initial image frame with reference to the location information of the target object key point in the last image frame.

In an embodiment, the initial frame key point information optimization module 901 is further configured to perform affine transformation on the following image frame of the preceding image frame according to an affine transformation relationship between the preceding location information and the target object key point template, to obtain a target object diagram in the following image frame; and perform key point detection on the target object diagram in the following image frame to obtain the location information of the target object key point in the following image frame.

In an embodiment, the affine transformation module 904 is further configured to determine, in ascending order of distances from the current image frame, a preset quantity of image frames in the video before the current image frame as reference image frames; and the segmentation module 908 is further configured to average, in a case that there are a plurality of reference image frames, segmentation information of the target object determined according to first location information of the target object key point in each reference image frame, to obtain final segmentation information of the target object; calculate an average value of second location information determined according to the first location information of the target object key point in each reference image frame to obtain final second location information of the target object key point; and map the final segmentation information of the target object and the final second location information of the target object key point to the current image frame.

In an embodiment, the target object information obtaining module 906 is further configured to input the target object diagram to a multi-task network, and perform encoding on the target object diagram to obtain a feature map of the target object diagram; perform key point detection on the feature map through a key point detection model in the multi-task network, and output the second location information of the target object key point corresponding to the target object diagram; and perform semantic segmentation on the feature map through a segmentation model in the multi-task network, and output the segmentation information of the corresponding target object.

In an embodiment, the target object information obtaining module 906 is further configured to perform section classification on the feature map through a section classification model in the multi-task network, to obtain a section category of the current image frame; determine, after a section category of each image frame in the video is determined, a quantity of image frames corresponding to each section category; and use a section category corresponding to a largest quantity of image frames as a section category corresponding to the video.

In an embodiment, the target object information obtaining module 906 is further configured to input the feature map to the pre-trained key point detection model, and output a location information difference between the target object key point in the target object diagram and the target object key point in the target object key point template; and add preset location information of the target object key point in the target object key point template and the location information difference to obtain the second location information of the target object key point in the target object diagram.

In an embodiment, the target object information obtaining module 906 is further configured to input the feature map to the pre-trained segmentation model and perform decoding, and output a first classification probability and a second classification probability that each pixel point in an obtained decoded image belongs to a foreground category and belongs to a background category; select, for each pixel point in the decoded image, a category corresponding to a larger classification probability of the first classification probability and the second classification probability corresponding to the pixel point as a category of the pixel point; and determine, according to pixel points in the decoded image that belong to the foreground category, the segmentation information of the target object corresponding to the target object diagram.

In an embodiment, the target object information obtaining module 906 is further configured to obtain one or more example image frames (or one or more sample image frames) in one or more example videos (or one or more sample videos); obtain first target object segmentation labels respectively corresponding to the example image frames; and input the example image frames and the corresponding first target object segmentation labels to an initial segmentation model, and perform iterative machine learning training to obtain a basic segmentation model (or initial segmentation model).

In an embodiment, the target object information obtaining module 906 is further configured to sequentially select current example image frames from the example image frames; for each current example image frame, select, from a label outline formed by a first target object segmentation label of a preceding example image frame of the current example image frame, a preset quantity of boundary feature points representing a target object boundary; track location information of the boundary feature points in the current example image frame through an optical flow tracking operation; connect the location information of the boundary feature points in the current example image frame and perform smoothing, to obtain a second target object segmentation label of the current example image frame; and perform iterative optimization and training on the basic segmentation model according to each example image frame and a corresponding second target object segmentation label, to obtain an optimized segmentation model.

In an embodiment, the target object information obtaining module 906 is further configured to mine a hard example pixel point in the current example image frame through the basic segmentation model, where the hard example pixel point is a background pixel point that is classified incorrectly; remove a pixel point other than the hard example pixel point and a target object pixel point from the current example image frame; and input each example image frame having a pixel point removed and a corresponding second target object segmentation label to the basic segmentation model, and perform iterative model optimization and training.

In an embodiment, the affine transformation module 904 is further configured to expand a label outline formed by a first target object segmentation label of each example image frame in an example video to a preset range; enlarge each expanded range according to a location law of the target object in the image frames, to obtain a tailoring range; perform tailoring for each of the example image frames to obtain a tailored picture matching the tailoring range; average location information of the target object key point in each tailored picture, to obtain preset location information of the target object key point; and generate the target object key point template according to the preset location information of the target object key point.

Figure 11:
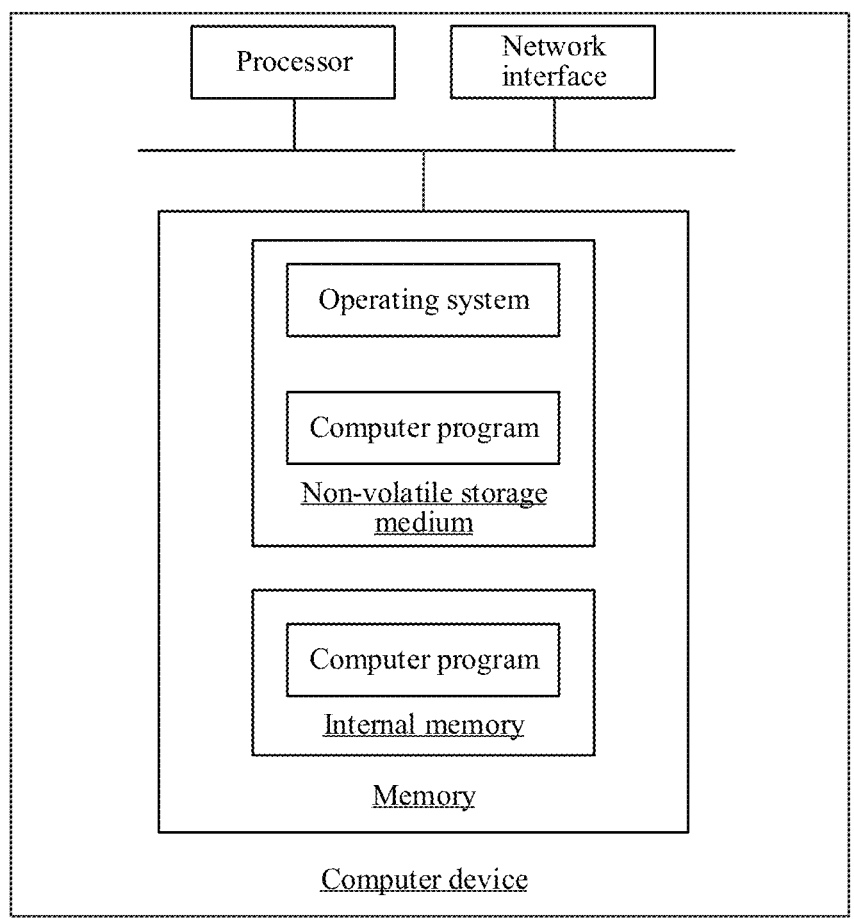
FIG. 11 is a schematic diagram of an inner structure of a computer device according to an embodiment.

FIG. 11 is a schematic diagram of an inner structure of a computer device according to an embodiment. With reference to FIG. 11, the computer device may be the server 120 shown in FIG. 1. It may be understood that, the computer device may be the terminal 110. The computer device includes a processor, a memory, and a network interface connected through a system bus. The memory includes a non-volatile storage medium and an internal memory. The non-volatile storage medium of the computer device may store an operating system and a computer program. When the computer program is executed, the processor may be caused to perform an image segmentation method. The processor of the computer device may be configured to provide calculation and control capabilities to support running of the computer device. The internal memory may store a computer program, the computer program, when executed by the processor, causing the processor to perform an image segmentation method. The network interface of the computer device is configured to perform network communication.

A person skilled in the art may understand that, the structure shown in FIG. 11 is only a block diagram of a part of a structure related to the disclosure and does not limit the scope of the one or more embodiments of the disclosure. Specifically, the computer device may include more or fewer parts or components than those shown in the accompanying drawings, or include a combination of some parts or components, or include different structural layouts.

In an embodiment, the image segmentation apparatus may be implemented in a form of a computer program. The computer program may be run on the computer device shown in FIG. 11, and the non-volatile storage medium of the computer device may store program modules constituting the image segmentation apparatus, for example, the selection module 902, the affine transformation module 904, the target object information obtaining module 906 and the segmentation module 908 shown in FIG. 9. The computer program constituted by the program modules is used for causing the computer device to perform the steps in the image segmentation method in the embodiments of this application described in this specification. For example, the computer device may sequentially select a current image frame according to a time sequence in a video by using the obtaining module 902 in the image segmentation apparatus 900 shown in FIG. 9. The computer device may determine, through the affine transformation module 904, a reference image frame from image frames before the current image frame in the time sequence in the video; obtain first location information of a target object key point in the reference image frame; and perform affine transformation on the current image frame with reference to an affine transformation relationship between the first location information and a target object key point template, to obtain a target object diagram of the current image frame. The computer device may perform, through the target object information obtaining module 906, key point detection on the target object diagram, to obtain second location information of the target object key point; and segment a target object from the target object diagram, to obtain segmentation information of the target object. The computer device may obtain, through the segmentation module 908, the target object through segmentation from the current image frame according to the segmentation information and the second location information.

In an embodiment, a computer device is provided, including a memory and a processor, the memory storing a computer program, the computer program, when executed by the processor, causing the processor to perform the following operations: sequentially selecting a current image frame according to a time sequence in a video; determining a reference image frame from image frames before the current image frame in the time sequence in the video; obtaining first location information of a target object key point in the reference image frame; performing affine transformation on the current image frame with reference to an affine transformation relationship between the first location information and a target object key point template, to obtain a target object diagram of the current image frame; performing key point detection on the target object diagram, to obtain second location information of the target object key point; segmenting a target object from the target object diagram, to obtain segmentation information of the target object; and obtaining the target object through segmentation from the current image frame according to the segmentation information and the second location information.

In an embodiment, the computer program, when executed by the processor, causes the processor to perform the following steps: detecting initial location information of the target object key point from an initial image frame of the video; taking the initial image frame as a preceding image frame and the initial location information as preceding location information, and detecting location information of a target object key point in a following image frame of the preceding image frame with reference to the preceding location information; taking the following image frame as a preceding image frame and the location information of the target object key point in the following image frame as preceding location information, and returning to the operation of detecting location information of a target object key point in a following image frame of the preceding image frame with reference to the preceding location information, to perform iteration, until location information of a target object key point in a last image frame of the video is obtained; and taking the last image frame as a preceding image frame of the initial image frame, and determining final location information of the target object key point in the initial image frame with reference to the location information of the target object key point in the last image frame.

In an embodiment, the computer program, when executed by the processor, causes the processor to perform the following steps: performing affine transformation on the following image frame of the preceding image frame according to an affine transformation relationship between the preceding location information and the target object key point template, to obtain a target object diagram in the following image frame; and performing key point detection on the target object diagram in the following image frame, to obtain the location information of the target object key point in the following image frame.

In an embodiment, the computer program, when executed by the processor, causes the processor to perform the following steps: determining, in ascending order of distances from the current image frame, a preset quantity of image frames in the video before the current image frame as reference image frames; averaging, in a case that there are a plurality of reference image frames, segmentation information of the target object determined according to first location information of the target object key point in each reference image frame, to obtain final segmentation information of the target object; calculating an average value of second location information determined according to the first location information of the target object key point in each reference image frame, to obtain final second location information of the target object key point; and mapping the final segmentation information of the target object and the final second location information of the target object key point to the current image frame.

In an embodiment, the computer program, when executed by the processor, causes the processor to perform the following steps: inputting the target object diagram to a multi-task network, and performing encoding to obtain a feature map of the target object diagram; performing key point detection on the feature map through a key point detection model in the multi-task network, and outputting the second location information of the target object key point corresponding to the target object diagram; and performing semantic segmentation on the feature map through a segmentation model in the multi-task network, and outputting the segmentation information of the corresponding target object.

In an embodiment, the computer program, when executed by the processor, causes the processor to perform the following steps: performing section classification on the feature map through a section classification model in the multi-task network, to obtain a section category of the current image frame; determining, after a section category of each image frame in the video is determined, a quantity of image frames corresponding to each section category; and taking a section category corresponding to a largest quantity of image frames as a section category corresponding to the video.

In an embodiment, the computer program, when executed by the processor, causes the processor to perform the following steps: inputting the feature map to the pre-trained key point detection model, and outputting a location information difference between the target object key point in the target object diagram and the target object key point in the target object key point template; and adding preset location information of the target object key point in the target object key point template and the location information difference, to obtain the second location information of the target object key point in the target object diagram.

In an embodiment, the computer program, when executed by the processor, causes the processor to perform the following steps: inputting the feature map to the pre-trained segmentation model and performing decoding, and outputting a first classification probability and a second classification probability that each pixel point in an obtained decoded image belongs to a foreground category and belongs to a background category; selecting, for each pixel point in the decoded image, a category corresponding to a larger classification probability of the first classification probability and the second classification probability corresponding to the pixel point as a category of the pixel point; and determining, according to pixel points in the decoded image that belong to the foreground category, the segmentation information of the target object corresponding to the target object diagram.

In an embodiment, the computer program, when executed by the processor, causes the processor to perform the following steps: obtaining example image frames in an example video; obtaining first target object segmentation labels respectively corresponding to the example image frames; and inputting the example image frames and the corresponding first target object segmentation labels to an initial segmentation model, and performing iterative machine learning training, to obtain a basic segmentation model.

In an embodiment, the computer program, when executed by the processor, causes the processor to perform the following steps: sequentially selecting current example image frames from the example image frames; for each current example image frame, selecting, from a label outline formed by a first target object segmentation label of a preceding example image frame of the current example image frame, a preset quantity of boundary feature points representing a target object boundary; tracking location information of the boundary feature points in the current example image frame through an optical flow tracking operation; connecting the location information of the boundary feature points in the current example image frame and performing smoothing, to obtain a second target object segmentation label of the current example image frame; and performing iterative optimization and training on the basic segmentation model according to each example image frame and a corresponding second target object segmentation label, to obtain an optimized segmentation model.

In an embodiment, the computer program, when executed by the processor, causes the processor to perform the following steps: mining a hard example pixel point in the current example image frame through the basic segmentation model, where the hard example pixel point is a background pixel point that is classified incorrectly; and removing a pixel point other than the hard example pixel point and a target object pixel point from the current example image frame; and the performing iterative optimization and training on the basic segmentation model according to each example image frame and a corresponding second target object segmentation label includes: inputting each example image frame having a pixel point removed and a corresponding second target object segmentation label to the basic segmentation model, and performing iterative model optimization and training.

In an embodiment, the computer program, when executed by the processor, causes the processor to perform the following steps: expanding a label outline formed by a first target object segmentation label of each example image frame in an example video to a preset range; enlarging each expanded range according to a location law of the target object in the image frames, to obtain a tailoring range; performing tailoring from each of the example image frames to obtain a tailored picture matching the tailoring range; averaging location information of the target object key point in each tailored picture, to obtain preset location information of the target object key point; and generating the target object key point template according to the preset location information of the target object key point.

In an embodiment, a non-transitory computer-readable storage medium is provided, storing a computer program, the computer program, when executed by a processor, causing the processor to perform the following operations: sequentially selecting a current image frame according to a time sequence in a video; determining a reference image frame from image frames before the current image frame in the time sequence in the video; obtaining first location information of a target object key point in the reference image frame; performing affine transformation on the current image frame with reference to an affine transformation relationship between the first location information and a target object key point template, to obtain a target object diagram of the current image frame; performing key point detection on the target object diagram, to obtain second location information of the target object key point; segmenting a target object from the target object diagram, to obtain segmentation information of the target object; and obtaining the target object through segmentation from the current image frame according to the segmentation information and the second location information.

In an embodiment, the computer program, when executed by the processor, causes the processor to perform the following steps: detecting initial location information of the target object key point from an initial image frame of the video; taking the initial image frame as a preceding image frame and the initial location information as preceding location information, and detecting location information of a target object key point in a following image frame of the preceding image frame with reference to the preceding location information; taking the following image frame as a preceding image frame and the location information of the target object key point in the following image frame as preceding location information, and returning to the operation of detecting location information of a target object key point in a following image frame of the preceding image frame with reference to the preceding location information, to perform iteration, until location information of a target object key point in a last image frame of the video is obtained; and taking the last image frame as a preceding image frame of the initial image frame, and determining final location information of the target object key point in the initial image frame with reference to the location information of the target object key point in the last image frame.

In an embodiment, the computer program, when executed by the processor, causes the processor to perform the following steps: performing affine transformation on the following image frame of the preceding image frame according to an affine transformation relationship between the preceding location information and the target object key point template, to obtain a target object diagram in the following image frame; and performing key point detection on the target object diagram in the following image frame, to obtain the location information of the target object key point in the following image frame.

In an embodiment, the computer program, when executed by the processor, causes the processor to perform the following steps: determining, in ascending order of distances from the current image frame, a preset quantity of image frames in the video before the current image frame as reference image frames; averaging, in a case that there are a plurality of reference image frames, segmentation information of the target object determined according to first location information of the target object key point in each reference image frame, to obtain final segmentation information of the target object; calculating an average value of second location information determined according to the first location information of the target object key point in each reference image frame, to obtain final second location information of the target object key point; and mapping the final segmentation information of the target object and the final second location information of the target object key point to the current image frame.

In an embodiment, the computer program, when executed by the processor, causes the processor to perform the following steps: inputting the target object diagram to a multi-task network, and performing encoding to obtain a feature map of the target object diagram; performing key point detection on the feature map through a key point detection model in the multi-task network, and outputting the second location information of the target object key point corresponding to the target object diagram; and performing semantic segmentation on the feature map through a segmentation model in the multi-task network, and outputting the segmentation information of the corresponding target object.

In an embodiment, the computer program, when executed by the processor, causes the processor to perform the following steps: performing section classification on the feature map through a section classification model in the multi-task network, to obtain a section category of the current image frame; determining, after a section category of each image frame in the video is determined, a quantity of image frames corresponding to each section category; and taking a section category corresponding to a largest quantity of image frames as a section category corresponding to the video.

In an embodiment, the computer program, when executed by the processor, causes the processor to perform the following steps: inputting the feature map to the pre-trained key point detection model, and outputting a location information difference between the target object key point in the target object diagram and the target object key point in the target object key point template; and adding preset location information of the target object key point in the target object key point template and the location information difference, to obtain the second location information of the target object key point in the target object diagram.

In an embodiment, the computer program, when executed by the processor, causes the processor to perform the following steps: inputting the feature map to the pre-trained segmentation model and performing decoding, and outputting a first classification probability and a second classification probability that each pixel point in an obtained decoded image belongs to a foreground category and belongs to a background category; selecting, for each pixel point in the decoded image, a category corresponding to a larger classification probability of the first classification probability and the second classification probability corresponding to the pixel point as a category of the pixel point; and determining, according to pixel points in the decoded image that belong to the foreground category, the segmentation information of the target object corresponding to the target object diagram.

In an embodiment, the computer program, when executed by the processor, causes the processor to perform the following steps: obtaining example image frames in an example video; obtaining first target object segmentation labels respectively corresponding to the example image frames; and inputting the example image frames and the corresponding first target object segmentation labels to an initial segmentation model, and performing iterative machine learning training, to obtain a basic segmentation model.

In an embodiment, the computer program, when executed by the processor, causes the processor to perform the following steps: sequentially selecting current example image frames from the example image frames; for each current example image frame, selecting, from a label outline formed by a first target object segmentation label of a preceding example image frame of the current example image frame, a preset quantity of boundary feature points representing a target object boundary; tracking location information of the boundary feature points in the current example image frame through an optical flow tracking operation; connecting the location information of the boundary feature points in the current example image frame and performing smoothing, to obtain a second target object segmentation label of the current example image frame; and performing iterative optimization and training on the basic segmentation model according to each example image frame and a corresponding second target object segmentation label, to obtain an optimized segmentation model.

In an embodiment, the computer program, when executed by the processor, causes the processor to perform the following steps: mining a hard example pixel point in the current example image frame through the basic segmentation model, where the hard example pixel point is a background pixel point that is classified incorrectly; and removing a pixel point other than the hard example pixel point and a target object pixel point from the current example image frame; and the performing iterative optimization and training on the basic segmentation model according to each example image frame and a corresponding second target object segmentation label includes: inputting each example image frame having a pixel point removed and a corresponding second target object segmentation label to the basic segmentation model, and performing iterative model optimization and training.

In an embodiment, the computer program, when executed by the processor, causes the processor to perform the following steps: expanding a label outline formed by a first target object segmentation label of each example image frame in an example video to a preset range; enlarging each expanded range according to a location law of the target object in the image frames, to obtain a tailoring range; performing tailoring from each of the example image frames to obtain a tailored picture matching the tailoring range; averaging location information of the target object key point in each tailored picture, to obtain preset location information of the target object key point; and generating the target object key point template according to the preset location information of the target object key point.

The terms "first", "second", "third" or the like used in the disclosure are merely used to clearly distinguish one element from another element, and are not intended to limit the scope of the disclosure in aspects of a size, an order, subordination, or the like.

The expression "at least one of a, b, and c," should be understood as including only a, only b, only c, both a and b, both a and c, both b and c, or all of a, b, and c. The terms such as "first", "second", or the like may be used to modify various elements regardless of order and/or importance, and to simply distinguish one element from another element.

The term used in the one or more embodiments of the disclosure such as "unit" or "module" indicates a unit for processing at least one function or operation, and may be implemented in hardware, software, or in a combination of hardware and software.

The term "unit" or "module" may be implemented by a program that is stored in an addressable storage medium and executable by a processor.

For example, the term "unit" or "module" may include software components, object-oriented software components, class components and task components, processes, functions, attributes, procedures, subroutines, segments of a program code, drivers, firmware, microcode, circuitry, data, databases, data structures, tables, arrays, and/or variables.

For example, the term "unit" or "module" may be implemented using one or more processors (or processors and memory). Likewise, a processor (or processor and memory) can be used to implement one or more modules or units. Moreover, each module or unit can be part of an overall module or unit that includes the functionalities of the module or unit.

It is to be understood that the one or more embodiments may not be necessarily performed in a sequence or order indicated by the step numbers. Unless clearly indicated otherwise, the steps are performed without any strict sequence limitation, and may be performed in other orders. Moreover, at least some of the steps in the embodiments may include a plurality of sub-steps or a plurality of stages. The sub-steps or stages may not be necessarily performed at the same moment but may be performed at different moments. The sub-steps or stages are not necessarily performed sequentially, but may be performed in turn or alternately with other steps or at least some sub-steps or stages of other steps.

A person of ordinary skill in the art may understand that all or some of the processes of the methods in the foregoing embodiments may be implemented by a computer program instructing relevant hardware. The program may be stored in a non-volatile computer-readable storage medium. When the program is executed, the processes of the foregoing method embodiments are performed. Any reference to a memory, a storage, a database, or another medium used in the various embodiments provided in the disclosure may include a non-volatile and/or volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external high-speed cache. For the purpose of description instead of limitation, the RAM is available in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a RAM bus (Rambus) direct RAM (RDRAM), a direct Rambus dynamic RAM (DRDRAM), and a Rambus dynamic RAM (RDRAM).

The technical features in the foregoing embodiments may be randomly combined. For concise description, not all possible combinations of the technical features in the embodiments are described. However, as long as combinations of the technical features do not conflict with each other, the combinations of the technical features are considered as falling within the scope of the disclosure.

The foregoing embodiments only show several implementations of the disclosure, and descriptions thereof are in detail, but should not be construed as a limitation to the protection scope of the disclosure. A person of ordinary skill in the art may make various modifications, substitutions and improvements without departing from the inventive concept of the disclosure, and the various modifications, substitutions and improvements thereof shall fall within the protection scope of the disclosure. Therefore, the protection scope of the disclosure is to be subject to the appended claims.

What is claimed is:

1. An image segmentation method, performed by a computer device, the method comprising:
   sequentially selecting a current image frame among one or more image frames in a video according to a time sequence of the video;
   determining a reference image frame from among the one or more image frames before the current image frame in the time sequence of the video;
   obtaining first location information of a target object key point in the reference image frame;
   performing an affine transformation on the current image frame with reference to an affine transformation relationship between the first location information and a target object key point template to obtain a target object diagram of the current image frame;
   performing a key point detection on the target object diagram to obtain second location information of the target object key point;
   segmenting a target object from the target object diagram to obtain segmentation information of the target object; and
   obtaining the target object from the current image frame according to the segmentation information and the second location information.

2. The method according to claim 1, wherein the sequentially selecting the current image frame further comprises:
   detecting initial location information of a first target object key point from an initial image frame of the video;
   using the initial image frame as a first preceding image frame and the initial location information as first preceding location information, and detecting second location information of a second target object key point in a second image frame based on the first preceding image frame with reference to the first preceding location information;
   using the second image frame as a second preceding image frame and the second location information of the target object key point in the second image frame as second preceding location information, and detecting third location information of a third target object key point in a third image frame based on the second preceding image frame with reference to the second preceding location information; and
   using the third image frame as a third preceding image frame to the initial image frame, and determining location information of the first target object key point in the initial image frame with reference to the third location information of the third target object key point in the third image frame,
   wherein the third image frame is a last image frame among the one or more image frames in the video.

3. The method according to claim 2, wherein the detecting the second location information of the second target object key point in the second image frame based on the first preceding image frame with reference to the first preceding location information comprises:
   performing affine transformation on the second image frame according to an affine transformation relationship between the first preceding location information and the target object key point template, to obtain a target object diagram in the second image frame; and
   performing a key point detection on the target object diagram in the second image frame, to obtain the second location information of the second target object key point in the second image frame.

4. The method according to claim 1, wherein the determining the reference image frame from among the one or more image frames before the current image frame in the time sequence of the video comprises:
   determining, in an ascending order of distances from the current image frame, a preset quantity of image frames in the video before the current image frame as one or more reference image frames; and
   the obtaining the target object from the current image frame according to the segmentation information and the second location information comprises:
   based on determining that there are a plurality of reference image frames, calculating an average of segmentation information of the target object determined according to first location information of the target object key point in each reference image frame to obtain final segmentation information of the target object;
   calculating an average value of second location information determined according to the first location information of the target object key point in each reference image frame, to obtain final second location information of the target object key point; and
   mapping the final segmentation information of the target object and the final second location information of the target object key point to the current image frame.

5. The method according to claim 1, further comprising:
   inputting the target object diagram to a multi-task network, and performing encoding on the target object diagram to obtain a feature map of the target object diagram, wherein
   wherein the performing the key point detection on the target object diagram to obtain second location information of the target object key point further comprises:
   performing the key point detection on the feature map through a key point detection model in the multi-task network, and outputting the second location information of the target object key point corresponding to the target object diagram; and
   wherein the segmenting the target object from the target object diagram to obtain the segmentation information of the target object further comprises:

performing a semantic segmentation on the feature map through a segmentation model in the multi-task network, and outputting the segmentation information of the corresponding target object.

6. The method according to claim 5, wherein the inputting the target object diagram to the multi-task network, and performing the encoding on the target object diagram to obtain the feature map of the target object diagram further comprises:
performing section classification on the feature map through a section classification model in the multi-task network to obtain a section category of the current image frame;
determining, after a section category of each of the one or more image frames in the video is determined, a quantity of the one or more image frames corresponding to each section category; and
using a section category corresponding to a largest quantity of image frames as a section category corresponding to the video.

7. The method according to claim 5, wherein the performing key point detection on the feature map through the key point detection model in the multi-task network comprises:
inputting the feature map to a pre-trained key point detection model, and outputting a location information difference between the target object key point in the target object diagram and the target object key point in the target object key point template; and
adding preset location information of the target object key point in the target object key point template and the location information difference to obtain the second location information of the target object key point in the target object diagram.

8. The method according to claim 5, wherein the performing the semantic segmentation on the feature map through the segmentation model in the multi-task network, and outputting the segmentation information of the corresponding target object further comprises:
inputting the feature map to a pre-trained segmentation model and performing decoding on the feature map, and outputting a first classification probability and a second classification probability of each pixel point in an obtained decoded image belonging to a foreground category and a background category;
selecting, for each pixel point in the decoded image, a category corresponding to a larger classification probability of the first classification probability and the second classification probability corresponding to the pixel point as a category of the pixel point; and
determining, according to pixel points in the decoded image that belong to the foreground category, the segmentation information of the target object corresponding to the target object diagram.

9. The method according to claim 5, further comprising:
training the segmentation model, wherein the training the segmentation model comprises:
obtaining sample image frames in a sample video;
obtaining first target object segmentation labels respectively corresponding to the sample image frames; and
inputting the sample image frames and the corresponding first target object segmentation labels to an initial segmentation model, and performing iterative machine learning training to obtain a basic segmentation model.

10. The method according to claim 9, wherein the training the segmentation model further comprise:

sequentially selecting current sample image frames from the sample image frames; for each current example image frame,
selecting, from a label outline formed by a first target object segmentation label of a preceding sample image frame of the current example image frame, a preset quantity of boundary feature points representing a target object boundary;
tracking location information of the boundary feature points in the current example image frame through an optical flow tracking operation;
connecting the location information of the boundary feature points in the current sample image frame and performing smoothing to obtain a second target object segmentation label of the current sample image frame; and
performing iterative optimization and training on the basic segmentation model according to each sample image frame and a corresponding second target object segmentation label to obtain an optimized segmentation model.

11. The method according to claim 10, further comprising:
mining a hard example pixel point in the current sample image frame through the basic segmentation model, wherein the hard example pixel point is a background pixel point that is classified incorrectly; and
removing a pixel point other than the hard example pixel point and a target object pixel point from the current example image frame; and
the performing the iterative optimization and the training on the basic segmentation model according to each sample image frame and a corresponding second target object segmentation label comprises:
inputting each sample image frame having a pixel point removed and a corresponding second target object segmentation label to the basic segmentation model, and performing iterative model optimization and training.

12. The method according to claim 1, further comprises:
generating the target object key point template, wherein the generating the target object key point template further comprises:
expanding a label outline formed by a first target object segmentation label of each sample image frame in a sample video to a preset range;
enlarging each expanded range according to a location law of the target object in the one or more image frames to obtain a tailoring range;
performing tailoring for each of the sample image frames to obtain a tailored picture matching the tailoring range;
averaging location information of the target object key point in each tailored picture, to obtain preset location information of the target object key point; and
generating the target object key point template according to the preset location information of the target object key point.

13. An image segmentation apparatus, comprising:
at least one memory storing computer program code;
at least one processor configured to access the at least one memory and operate as instructed by the computer program code, the computer program code comprising:
selection code configured to cause the at least one processor to sequentially select a current image frame among one or more image frames in a video according to a time sequence of the video;

affine transformation code configured to cause the at least one processor to determine a reference image frame from among the one or more image frames before the current image frame in the time sequence of the video; obtain first location information of a target object key point in the reference image frame; and perform an affine transformation on the current image frame with reference to an affine transformation relationship between the first location information and a target object key point template to obtain a target object diagram of the current image frame;

target object information obtaining code configured to cause the at least one processor to perform a key point detection on the target object diagram to obtain second location information of the target object key point; and segment a target object from the target object diagram, to obtain segmentation information of the target object; and segmentation code configured to cause the at least one processor to obtain the target object from the current image frame according to the segmentation information and the second location information.

14. The apparatus according to claim 13, wherein the affine transformation code is further configured to cause the at least one processor to:

determine, in an ascending order of distances from the current image frame, a preset quantity of image frames in the video before the current image frame as one or more reference image frames; and wherein the segmentation code is further configured to cause the at least one processor to:

based on determining that there are a plurality of reference image frames, calculate an average of segmentation information of the target object determined according to first location information of the target object key point in each reference image frame, to obtain final segmentation information of the target object;

calculate an average value of second location information determined according to the first location information of the target object key point in each reference image frame, to obtain final second location information of the target object key point; and map the final segmentation information of the target object and the final second location information of the target object key point to the current image frame.

15. The apparatus according to claim 13, wherein the target object information obtaining code is further configured to cause the at least one processor to:

input the target object diagram to a multi-task network, and perform encoding on the target object diagram to obtain a feature map of the target object diagram;

perform the key point detection on the feature map through a key point detection model in the multi-task network, and output the second location information of the target object key point corresponding to the target object diagram; and perform a semantic segmentation on the feature map through a segmentation model in the multi-task network, and output the segmentation information of the corresponding target object.

16. The apparatus according to claim 15, wherein the target object information obtaining code is further configured to cause the at least one processor to:

perform section classification on the feature map through a section classification model in the multi-task network, to obtain a section category of the current image frame;

determine, after a section category of each of the one or more image frames in the video is determined, a quantity of the one or more image frames corresponding to each section category; and use a section category corresponding to a largest quantity of image frames as a section category corresponding to the video.

17. The apparatus according to claim 15, wherein the target object information obtaining code is further configured to cause the at least one processor to:

input the feature map to a pre-trained key point detection model, and output a location information difference between the target object key point in the target object diagram and the target object key point in the target object key point template; and add preset location information of the target object key point in the target object key point template and the location information difference, to obtain the second location information of the target object key point in the target object diagram.

18. The apparatus according to claim 15, wherein the target object information obtaining module is further configured to input the feature map to the pre-trained segmentation model and perform decoding, and output a first classification probability and a second classification probability that each pixel point in an obtained decoded image belongs to a foreground category and belongs to a background category; select, for each pixel point in the decoded image, a category corresponding to a larger classification probability of the first classification probability and the second classification probability corresponding to the pixel point as a category of the pixel point; and determine, according to pixel points in the decoded image that belong to the foreground category, the segmentation information of the target object corresponding to the target object diagram.

19. A non-transitory computer-readable storage medium, storing at least one computer program code, the at least one computer program code, when executed by a processor, causes the processor to:

sequentially select a current image frame among one or more image frames in a video according to a time sequence of the video;

determine a reference image frame from among the one or more image frames before the current image frame in the time sequence of the video;

obtain first location information of a target object key point in the reference image frame;

perform an affine transformation on the current image frame with reference to an affine transformation relationship between the first location information and a target object key point template to obtain a target object diagram of the current image frame;

perform a key point detection on the target object diagram to obtain second location information of the target object key point;

segment a target object from the target object diagram to obtain segmentation information of the target object; and obtain the target object from the current image frame according to the segmentation information and the second location information.

20. The non-transitory computer-readable storage medium according to claim 19, wherein the at least one computer program code is executed by the processor to:

determining, in an ascending order of distances from the current image frame, a preset quantity of image frames in the video before the current image frame as one or more reference image frames; and the obtaining the target object from the current image frame according to the segmentation information and the second location information comprises:

based on determining that there are a plurality of reference image frames, calculating an average of segmentation information of the target object determined according to first location information of the target object key point in each reference image frame to obtain final segmentation information of the target object;

calculating an average value of second location information determined according to the first location information of the target object key point in each reference image frame, to obtain final second location information of the target object key point; and mapping the final segmentation information of the target object and the final second location information of the target object key point to the current image frame.

* * * * *